US010475277B2

(12) United States Patent
Reeves et al.

(10) Patent No.: US 10,475,277 B2
(45) Date of Patent: Nov. 12, 2019

(54) SYSTEMS AND METHODS FOR MODIFYING A GRAPHICAL USER INTERFACE FOR FACILITATING A ROULETTE GAME

(71) Applicant: Gamesys Ltd., London (GB)

(72) Inventors: Robeson Mandela Reeves, London (GB); Jagbir Rehil, London (GB)

(73) Assignee: Gamesys, Ltd., London (GB)

( * ) Notice: Subject to any disclaimer, the term of this patent is extended or adjusted under 35 U.S.C. 154(b) by 664 days.

(21) Appl. No.: 14/838,917

(22) Filed: Aug. 28, 2015

(65) Prior Publication Data

US 2016/0063799 A1 Mar. 3, 2016

Related U.S. Application Data

(60) Provisional application No. 62/043,407, filed on Aug. 28, 2014.

(51) Int. Cl.
*A63F 13/00* (2014.01)
*G07F 17/32* (2006.01)

(52) U.S. Cl.
CPC ........ *G07F 17/3225* (2013.01); *G07F 17/326* (2013.01); *G07F 17/3244* (2013.01); *G07F 17/3286* (2013.01)

(58) Field of Classification Search
CPC ............. G07F 17/3225; G07F 17/3244; G07F 17/326; G07F 17/3286
See application file for complete search history.

(56) References Cited

U.S. PATENT DOCUMENTS 6,572,474 B2 6/2003 Rudd
8,308,547 B2 11/2012 Walker et al.
2004/0023712 A1 2/2004 Oliver
2004/0166918 A1* 8/2004 Walker .................... G07F 17/32 463/16
2004/0192432 A1* 9/2004 Walker .................... G07F 17/32 463/20

(Continued)

FOREIGN PATENT DOCUMENTS

WO WO2007077449 7/2007

OTHER PUBLICATIONS

Website: "PlayRoulette Online" (http://playrouletteonline.co/multiwheel-roulette/) download date: Nov. 23, 2015; 2 pps.

(Continued)

*Primary Examiner* — Omkar A Deodhar
*Assistant Examiner* — Eric M Thomas
(74) *Attorney, Agent, or Firm* — Fincham Downs LLC; Magdalena M. Fincham

(57) ABSTRACT

In accordance with some embodiments, a gaming apparatus provides for facilitating a roulette game which allows for wagering on multi-spin wagers, wherein a win result of the multi-spin wager is dependent on a plurality of independently-determined results of the roulette game, and further wherein the wager defines a predetermined relationship the plurality of independently-determined results must bear to one another in order for the player to win the wager. The gaming apparatus is, in accordance with some embodiments, operable to modify a graphical user interface to indicate progress in a game instance of the multi-spin wager.

20 Claims, 9 Drawing Sheets

(56) References Cited

U.S. PATENT DOCUMENTS

| | | | | |
|---|---|---|---|---|
| 2004/0192434 | A1* | 9/2004 | Walker | G06Q 40/025 463/25 |
| 2005/0212210 | A1 | 9/2005 | Ogiwara | |
| 2006/0052149 | A1 | 3/2006 | Bursil | |
| 2006/0168107 | A1 | 7/2006 | Balan | |
| 2007/0135204 | A1 | 6/2007 | Nicely | |
| 2011/0092270 | A1 | 4/2011 | Jarvis et al. | |

OTHER PUBLICATIONS

Website: "Roulette Strategy" (http://www.roulettestrategy.net/bets) download date: Nov. 23, 2015; 3 pps.
Website: "Roulette Scripter Studio" (http://www.slideshare.net/roulettesystem/roulette-scripter-studio-the-most-advanced-auto-play-roulette-tool) download date: Nov. 23, 2015; 9 pps.
Office Action for U.S. Appl. No. 15/090,562 dated Oct. 6, 2017; 14 pps.
Final Office Action for U.S. Appl. No. 15/090,562 dated Jul. 31, 2018; 10 pps.
Office Action for U.S. Appl. No. 15/090,562 dated Jan. 10, 2019; 22 pps.

* cited by examiner

SYSTEMS AND METHODS FOR MODIFYING A GRAPHICAL USER INTERFACE FOR FACILITATING A ROULETTE GAME

CLAIM OF PRIORITY

The present application claims the benefit of priority of U.S. Provisional Application No. 62/043,407 filed Aug. 28, 2014 in the name of Reeves et al., titled SYSTEMS AND METHODS FOR A ROULETTE GAME. The entirety of this provisional application is incorporated by reference herein for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

DETAILED DESCRIPTION OF EMBODIMENTS

Figure 1:
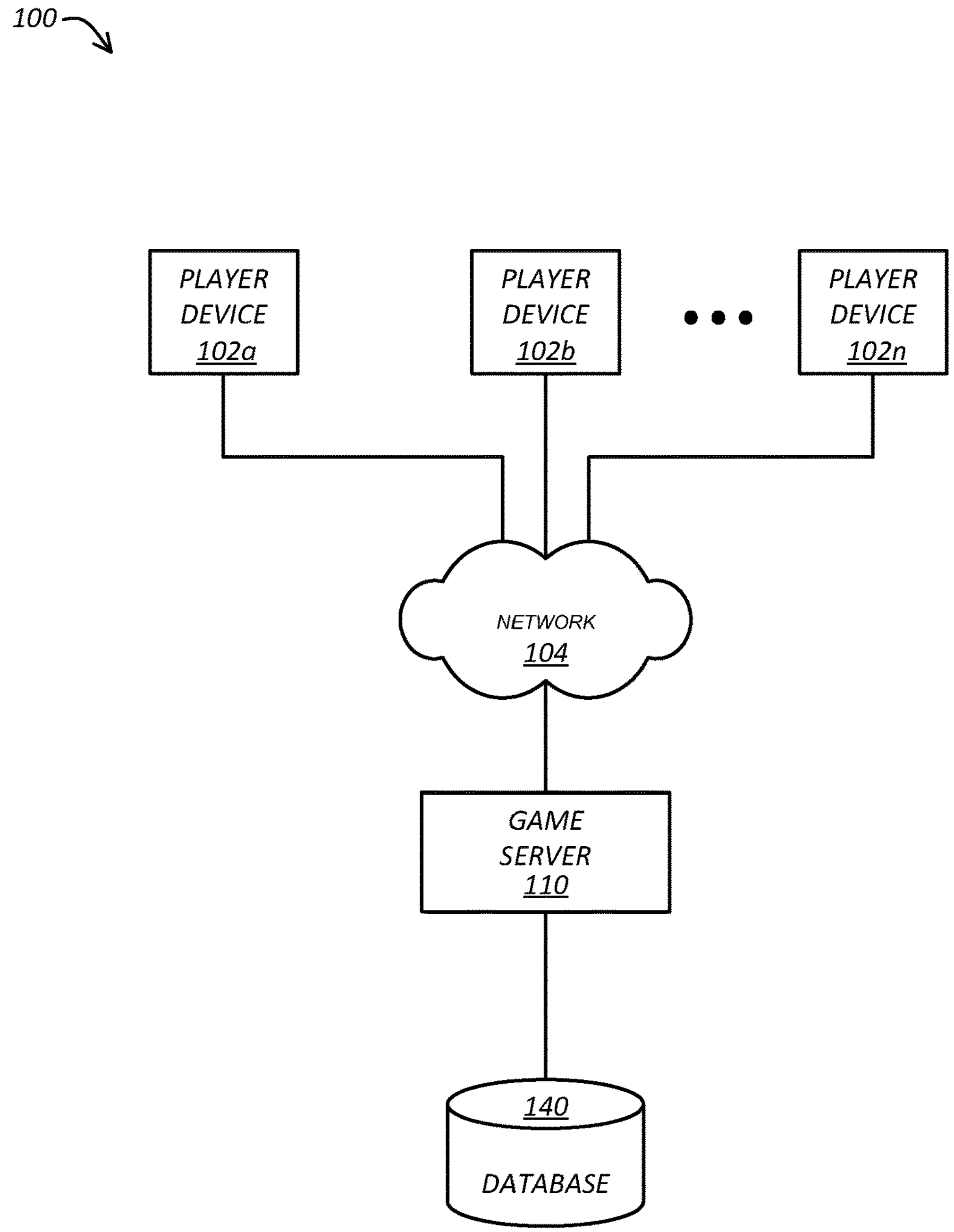
FIG. 1 is a schematic diagram of an embodiment of a gaming system in accordance with one or more embodiments described herein.

Described herein are various embodiments of an inventive roulette game (e.g., a virtual roulette game, such as may be played online via a player device) which provides for allowing a player to bet on a result which depends on at least two spins (e.g., two consecutive spins) of a roulette wheel, such that whether the bet is a winning bet or losing bet cannot be determined until the outcome of each of the spins is determined. For example, player may be provided an opportunity to place a wager on the result of the next two (2) consecutive roulette spins as a fixed odds bet prior to the outcome of the first spin of the two (2) spins being output or, in some embodiments, even determined. In such a wager, whether the player wins the wager at all (and not just an amount of payout or win for the bet) depends on the outcomes of both spins. For example, the player may be allowed to place a bet that the next two spins will result in the ball landing on a different color for the respective spins (i.e., the ball will land on red for one spin and on black for the other spin) and the determination of whether the player has won the bet will be made once the outcome of both spins corresponding to the player's bet have been determined. In other words, in accordance with some embodiments, the determination of whether a bet is a winning bet (such that a payout is provided to the player) or a losing bet (such that the player loses the amount of value placed on the bet and does not receive a payout) is dependent two or more outcomes, each outcome corresponding to a respective spin of the roulette wheel (or, in some embodiments, each outcome corresponding to a respective ball being spun, even if the two or more balls are spun simultaneously). Whether a bet is a winning bet or a losing bet is referred to herein as a win result and the determination of whether a bet is a winning bet or a losing bet is referred to herein as a win result determination.

In some embodiments, a win result of a bet encompassing two or more outcomes (e.g., two or more outcomes of distinct spins of a roulette wheel) is further dependent on whether one outcome of the two or more outcomes encompassed by the bet bears a pre-determined relationship to at least one other outcome of the two or more outcomes encompassed by the bet. For example, the player may bet that a number comprising the outcome of the second spin will be a higher number than a number comprising the outcome of the first spin. In a conventional roulette game, a determination of whether a bet on a spin of a roulette wheel is a winning bet or a losing bet is in actuality independent of a result of any previous spin (despite certain strategies and theories some players employ, which attempt to predict an outcome of an upcoming roulette spin based on outcomes of previous roulette spin(s)).

In accordance with some embodiments, methods, systems and articles of manufacture (e.g., non-transitory computer-readable media) provide for (i) receiving, from a player, an indication of a wager on a win result dependent on a plurality of outcomes to be determined over a course of a plurality of spins (e.g., of a single roulette wheel), each outcome of the plurality of outcomes corresponding to a respective one spin of the plurality of spins; (ii) determining (e.g., after the indication of the wager is received), for each spin of the plurality of spins, a respective outcome, thereby determining the plurality of outcomes; (iii) determining, based on each of the plurality of outcomes, whether the wager is a winning wager; and (iv) providing a payout to a player associated with the wager if the wager is a winning wager. In other words, in order for a player to win the wager, a plurality of spins of a roulette wheel are executed (e.g., a plurality of consecutive spins) and the outcomes of those spins need to satisfy the result the player has wagered will occur, such that the win result of the wager is dependent on the plurality of spins (e.g., plurality of consecutive spins) or the plurality of outcomes.

An "outcome" should be differentiated from a "result" in the present description in that an "outcome" is a representation of game indicia determined via a process or algorithm as the final output of a game event (e.g., a spin of a roulette when) which, after taking into account a player's bet option, amount bet and odds associated with the bet option, allows a determination of a "result" for the game event. For example, in a roulette game, an "outcome" of a spin of the game may comprise a "red 7" and the "result" corresponding to this outcome, based on a bet of a particular player who selected a bet option that the outcome would include a "red" game indicia, is that the player wins the bet and is provided a payout based on the amount of the bet and the odds associated with the bet. It should be noted that the embodiments described herein encompass prizes which may comprise awards, payouts, discounts, eligibility, advancement in a game or other benefits (whether monetary or non-monetary, tangible or intangible) to a player and that any reference to a "prize", "award" or "payout" may refer to any or all of the foregoing, unless the context explicitly indicates otherwise.

A brief overview of roulette games is provided herein, along with a discussion of relevant terminology. It should be understood that features such as a "roulette wheel" and "balls" need not be conventional physical elements. Simulated or virtual wheels and balls are also to be included in the embodiments described herein. Thus, the generic term used herein is "roulette wheel" or ball, which may refer to either "physical" or "virtual" renditions of the wheel or ball. In a virtual roulette table (e.g., in a roulette game embodied as an online or other electronic or software-based game) the physical wheel is replaced with a virtual wheel whose image is provided on a display.

The term "roulette wheel" may refer to an American or European (both explained below) roulette wheel or another non-traditional type of roulette wheel; the embodiments described herein are not dependent on any particular rendition or configuration of a roulette wheel. For example, the numbers and/or colors on the wheel could be arranged in any desirable manner; more or fewer numbers than traditional could be included, and/or the numbers could be replaced by symbols (e.g., fruit). Similarly, "spinning" of a wheel can cover any arrangement (e.g., a graphical animation) where a number on a roulette wheel is selected in what appears to be (or actually is) a random (or pseudo-random, based on a pseudo-random algorithm) manner.

In a typical roulette game, players place bets by positioning their chips relative to one or more indicia (e.g., at least one number and/or color of the roulette wheel) such that a bet option is selected. The roulette wheel then spins and a ball is introduced onto the wheel. The ball moves around the wheel in a direction opposite the rotation of the wheel and slows until it falls into a labeled area of the wheel (e.g., into an area labeled or associated with a particular color, number and/or other indicia). If the bet option a player had selected is satisfied by the area of the wheel in which the ball stops, the player wins the bet and is provided with a payout (e.g., the payout amount dependent on the bet amount and the odds of the bet option). Otherwise, the player is considered to have lost the bet and the chips or credits the player bet on the spin are collected from the player. In a multi-wheel roulette game, multiple roulette wheels may be spun simultaneously and the player may place a bet on one or more of the wheels (selecting the same bet option for each wheel or different bet options for different wheels, depending on the rules of the game). Irrespective of whether the game includes a single wheel or multiple wheels, the outcome of each spin of a given wheel is independent of any previous outcomes and is independent of the outcomes on the other wheels. Similarly, the result of each bet option selected by the player is dependent only on the outcome of the single spin on which the bet option is placed. Some roulette games have a historical outcomes display that lists outcomes from previous spins. For example, outcomes for the last ten spins may be displayed. While the outcome of each spin is independent of every other spin (and the result of each bet option is independent of the result of any previous bet option), some players may use this historical outcome listing to assist them in guessing which numbers are "due" or which numbers are "hot" or to otherwise try to predict subsequent outcomes when placing a bet.

As briefly mentioned above, there are two generally recognized styles of roulette wheels, namely U.S. and European. The difference between the two styles is that the U.S. style roulette wheel includes the numbers zero through thirty-six and a double zero. In contrast, the European style roulette wheel includes just numbers zero through thirty-six. Additionally, the number placement on the wheel differs between the U.S. style and the European style, such that while some numbers may be next to each other on a U.S. wheel, the numbers may not be next to each other on a European wheel.

Conventional betting options typically presented on a roulette table include the numbers individually (a straight or straight up bet), even, odd, red, black, low (numbers one through eighteen), high (numbers nineteen through thirty-six), first twelve (numbers one through twelve), second twelve (numbers thirteen through twenty-four), third twelve (numbers twenty-five through thirty-six), first column (numbers one, four, seven, ten, thirteen, sixteen, nineteen, twenty-two, twenty-five, twenty-eight, thirty-one, and thirty-four), second column (numbers two, five, eight, eleven, fourteen, seventeen, twenty, twenty-three, twenty-six, twenty-nine, thirty-two, and thirty-five), and third column (numbers three, six, nine, twelve, fifteen, eighteen, twenty-one, twenty-four, twenty-seven, thirty, thirty-three, and thirty-six). Each of these bet options is typically represented via indicia on the table.

There are other conventional wagers that do not have specific indicia, but whose import is known to roulette players. For example, a split bet is a wager on two numbers that appear next to one another. A player selecting this bet option may indicate this by placing a chip on the line between the two bet options (e.g., the line between one and four or twenty-nine and thirty) or by selecting a corresponding area of an interface in a virtual (e.g., online) roulette game. In another example, a street bet (sometimes called a row bet) is a wager on three numbers on the same row. A player selecting this bet option may indicate this by placing a chip outside the row of numbers on which he is wagering (e.g., to wager on one-two-three, the chip is placed on the line that is the outside edge of the three) or by selecting a corresponding area of an interface in a virtual (e.g., online) roulette game. In yet another example, a corner bet is a wager on four adjoining numbers. A player selecting this bet option may indicate this by placing a chip at the four-way intersection of the four numbers (e.g., at the intersection of thirty-one, thirty-two, thirty-four, and thirty-five) or by selecting a corresponding area of an interface in a virtual (e.g., online) roulette game. In yet another example, a square bet is a wager on zero, one, two, or three and is denoted by placing the chip at the intersection of zero and three at the corner of a European style wheel. A five number bet is similar to the square bet, but adds the double zero. A player selecting this bet option may indicate this by placing a chip at the intersection of zero and one, on the corner, or by selecting a corresponding area of an interface in a virtual (e.g., online) roulette game. A line bet is in essence wagering on two streets or rows. A player selecting this bet option may indicate this by placing a chip on the outer intersection of the two rows in question (e.g., to bet on seven through twelve, a chip would be placed at the outer intersection of nine and twelve) or by selecting a corresponding area of an interface in a virtual (e.g., online) roulette game. A summary of some conventional wagers and the odds are presented below in table 1.

TABLE 1

| Wager Name | Numbers Covered | Odds |
|---|---|---|
| Straight Up Bet | 1 | 35:1 |
| Split Bet | 2 | 17:1 |

TABLE 1-continued

| Wager Name | Numbers Covered | Odds |
|---|---|---|
| Street (row) Bet | 3 | 11:1 |
| Corner Bet | 4 | 8:1 |
| Square Bet | 4 (0, 1, 2, 3) | 8:1 |
| Five Number Bet | 5 (0, 00, 1, 2, 3) | 6:1 |
| Line Bet | 6 | 5:1 |
| Dozens | 12 | 2:1 |
| Columns | 12 | 2:1 |
| Low/High | 18 | 1:1 |
| Odd/Even | 18 | 1:1 |
| Red/Black | 18 | 1:1 |

In accordance with embodiments described herein, a player is provided an opportunity to place a new type of bet which is a bet on a plurality of game events (e.g., a plurality of spins of a roulette wheel or a plurality of ball outcomes for multiple balls on a single spin), wherein the win result of the bet (i.e., a determination of whether the bet is a winning bet or a losing bet) is dependent on the result of a set or plurality of outcomes defined by the bet (e.g., a set or plurality of spins of a roulette wheel, such as the next two or more spins of the roulette wheel). In accordance with some embodiments, the player is required to place the bet without any knowledge of the outcome of the first game event, such as the outcome of the first spin of a roulette wheel. For example, the player may be required to place the bet prior to the outcome of the first game event being determined (e.g., by an algorithm employing a Random Number Generator (RNG)) or prior to the outcome for the first game event being output to the player (such that in some embodiments at least the first outcome of the set of outcomes may have been determined by the time the player places his/her bet, but the at least first outcome has not yet been output or indicated to the player). Whether the player wins the bet is thus dependent on each of the set of outcomes included in the set of outcomes corresponding to the bet (e.g., the outcomes of the next two spins of the roulette wheel if the player places a bet indicating what he/she is betting will happen over the course of the next two spins in terms of the outcomes determined). Some non-limiting examples of bets defining a win result of a plurality of roulette spins are provided herein.

Different Colors:

In this type of bet, the player is allowed an opportunity to place a bet on how a characteristic of one outcome compare to the same characteristic of another outcome. In one embodiment, the characteristic is a color or other game indicia of the outcome. In one embodiment, the player is provided an opportunity to bet whether two or more outcomes will share a characteristic (e.g., will be the same color). For example, the player may bet that, for the next two spins of the roulette wheel, the outcome of each spin will be a different color from the other. For example, if the outcome of one spin is "red" (the ball lands on a red area of the wheel) and the outcome of the other spin is "black" (the ball lands on black), then the player wins. If both spins result in the same color (the ball lands on the same color for each spin), the bet is a losing bet and the player loses his wager amount. In one embodiment, the ball or roulette wheel is spun twice (or, in some embodiments, two roulette wheels are spun either in series or simultaneously) to determine the win result of this bet. The sequence of outcomes may be irrelevant in some embodiments of this bet (i.e., it may be irrelevant whether the first outcome is red and the second outcome is black of vice versa) while in other embodiments the player may further narrow his bet by indicating a sequence in which the different colors or outcomes will occur (e.g., player bets that the first outcome will be red and the second will be black), which may result in longer odds and a higher payout for the player if the player wins such a bet. In some embodiments, such a "different color" bet may be placed on a single spin in which two balls are spun but the win result of the bet is still dependent on the outcome of each ball (what color each ball lands on), such that the win result of the bet is dependent on a plurality of outcomes. Of course, the two spins or two balls used in this example are for illustrative purposes only and any number of spins or balls may be used (e.g., the player may bet that of the next ten spins, the ball will land on "red" in at least four of the spins such that the win result of the bet will be determined once the outcomes for each of the ten spins encompassed by the bet are determined).

The odds for a "Different Colors" type of multi-spin wager may be determined in a variety of manners. In one example embodiment, assuming the wager pays even money, the odds for a "Different Colors" type of multi-spin water may be as follows:

(i) Assuming that landing on zero on your first spin results in a losing bet:

probability that the ball lands on a red or black on the first spin=36/37 probability that the ball lands on the opposite colour on the second spin=18/37

$$\text{Total probability}=(36/37)*(18/37)=0.473338$$

(ii) Assuming that landing on zero on your first spin results in a re-spin probability that the ball lands on a red of black on the first spin=1 probability that the ball lands on the opposite colour on the second spin=18/37

$$\text{Total probability}=1*(18/37)=18/37$$

Hi-Lo:

In this type of bet, the player bets on how a first outcome will relate in some predetermined manner to another outcome (similar to the "Different Colors" type of bet described above but focusing on a different characteristic, such as a number indicia). For example, the player may be whether a number comprising a first outcome will be lower or higher than a number comprising a second outcome. If the player bets on "Hi", he is betting that, for the next two spins of the roulette wheel, the outcome of the first spin (the number the ball lands on for the first spin) will be higher than the outcome determined for the second spin (the number the ball lands on for the second spin). For example, if the outcome of the first spin is "10" (the ball lands on the number "10" of the wheel) and the outcome of the second spin is "7" (the ball lands on the number "7" of the wheel), then the player wins the bet. If, on the other hand, the outcome of the second spin is a number higher than the "10" outcome of the first spin, the bet is a losing bet and the player loses his wager amount. Similarly, if the player places a bet on "Low", he is betting that the outcome of the first spin will be a number that is lower than the number which is the outcome for the second spin.

The odds for a "Hi-Lo" type of multi-spin wager may be determined in a variety of manners. In one example embodiment, assuming the wager pays even money, the odds for a "Hi-Lo" type of multi-spin water may be 18/37.

Over-Under:

In this bet the player is betting that when the outcomes of two or more spins are combined together in accordance with some predetermined manner (e.g., the number comprising the respective outcomes are added together), the result will be within some predetermined category of results (e.g., the sum of the numbers will be higher than a predetermined number or lower than a predetermined number). Of course, other mathematical relationships or manners of combining outcomes may be utilized (e.g., the numbers may be averaged, subtracted, used as values in some other formula, etc.). The ball or roulette wheel is spun the appropriate number of times (or, in some embodiments, multiple roulette wheels are spun either in series or simultaneously) to obtain the appropriate number of outcomes to be combined in order to determine the win result of the bet. For example, the player may bet that the sum of numbers of the next two spins will be under 36, in which case a roulette wheel may be spun twice and the respective numbers on which the ball lands may be added to determine the sum. If the sum of the numbers is less than 36, the win result of the bet is that the player wins the bet. If the sum of the numbers is 36 or greater, the player loses the bet. Similarly, the player may be that the sum of number comprising the plurality of outcomes encompassed by the bet will be over (or equal to) a predetermined number. In some embodiments, the player may also be allowed to select the predetermined number while in other embodiments the predetermined number is preset or selected by a processor (e.g., randomly selected by the processor).

The odds for an "Over-Under" type of multi-spin wager may be determined in a variety of manners. In one example embodiment, assuming the wager pays even money, the odds for an "Over-Under" type of multi-spin water may be (assuming the wager has been set to be over 36 or under 36) 18/37.

Certain aspects, advantages, and novel features of various embodiments of a roulette game are described herein. It is to be understood that not necessarily all such advantages may be achieved in accordance with any particular embodiment. Thus, for example, those skilled in the art will recognize different embodiments may be implemented or carried out in a manner that achieves one advantage or group of advantages as taught herein without necessarily achieving other advantages as may be taught or suggested herein.

Although several embodiments, examples and illustrations are disclosed below, it will be understood by those of ordinary skill in the art that the invention described herein extends beyond the specifically disclosed embodiments, examples and illustrations and includes other uses of the invention and obvious modifications and equivalents thereof. Embodiments of the invention(s) are described with reference to the accompanying figures, wherein like numerals refer to like elements throughout. The terminology used in the description presented herein is not intended to be interpreted in any limited or restrictive manner simply because it is being used in conjunction with a detailed description of certain specific embodiments of the invention(s). In addition, embodiments of the invention(s) can comprise several novel features and it is possible that no single feature is solely responsible for its desirable attributes or is essential to practicing the invention(s) herein described.

Throughout the description that follows and unless otherwise specified, the following terms may include and/or encompass the example meanings provided in this section. These terms and illustrative example meanings are provided to clarify the language selected to describe embodiments both in the specification and in the appended claims, and accordingly, are not intended to be limiting. Other terms are defined throughout the present description.

A "game", as the term is used herein unless specified otherwise, may comprise any game (e.g., wagering or non-wagering, electronically playable over a network) playable by one or more players in accordance with specified rules. A game may be playable on a personal computer online in web browsers, on a game console and/or on a mobile device such as a smartphone or tablet computer. A game may also be playable on a dedicated gaming device (e.g., a slot machine in a brick-and-mortar casino). "Gaming" thus refers to play of a game.

A "casual game", as the term is used herein unless specified otherwise, may comprise a game with simple rules with little or no time commitment on the time of a player to play. A casual game may feature, for example, very simple game play such as a puzzle or Scrabble™ game, may allow for short bursts of play (e.g., during work breaks), an ability to quickly reach a final stage and/or continuous play without a need to save the game.

A "social network game", as used herein unless specified otherwise, refers to a type of online game that is played through a social network, and in some embodiments may feature multiplayer and asynchronous game play mechanics. A "social network" may refer to an online service, online community, platform, or site that focuses on facilitating the building of social networks or social relations among people. A social network service may, for example, consist of a representation of each user (often a profile), his/her social links, and a variety of additional services. A social network may be web-based and provide means for users to interact over the Internet, such as e-mail and instant messaging. A social network game may in some embodiments be implemented as a browser game, but can also be implemented on other platforms such as mobile devices.

A "wagering game", as the term is used herein, may comprise a game on which a player can risk a wager or other consideration, such as, but not limited to: slot games, poker games, blackjack, baccarat, craps, roulette, lottery, bingo, keno, casino war, etc. A wager may comprise a monetary wager in the form of an amount of currency or any other tangible or intangible article having some value which may be risked on an outcome of a wagering game. "Gambling" or "wagering" refers to play of a wagering game.

The term "game provider", as used herein unless specified otherwise, refers to an entity or system of components which provides, or facilitates the provision of, games for play and/or facilitates play of such game by use of a network such as the Internet or a proprietary or closed networks (e.g., an intranet or wide area network). For example, a game provider may operate a website which provides games in a digital format over the Internet. In some embodiments in which a game comprising a wagering game is provided, a game provider may operate or facilitate a gambling website over which wagers are accepted and results of wagering games are provided.

The terms "information" and "data", as used herein unless specified otherwise, may be used interchangeably and may refer to any data, text, voice, video, image, message, bit, packet, pulse, tone, waveform, and/or other type or configuration of signal and/or information. Information may comprise information packets transmitted, for example, in accordance with the Internet Protocol Version 6 (IPv6) standard as defined by "Internet Protocol Version 6 (IPv6) Specification" RFC 1883, published by the Internet Engineering Task Force (IETF), Network Working Group, S. Deering et al. (December 1995). Information may, according to some embodiments, be compressed, encoded, encrypted, and/or otherwise packaged or manipulated in accordance with any method that is or becomes known or practicable.

The term "indication", as used herein unless specified otherwise, may refer to any indicia and/or other information indicative of or associated with a subject, item, entity, and/or other object and/or idea. As used herein, the phrases "information indicative of" and "indicia" may be used to refer to any information that represents, describes, and/or is otherwise associated with a related entity, subject, or object. Indicia of information may include, for example, a code, a reference, a link, a signal, an identifier, and/or any combination thereof and/or any other informative representation associated with the information. In some embodiments, indicia of information (or indicative of the information) may be or include the information itself and/or any portion or component of the information. In some embodiments, an indication may include a request, a solicitation, a broadcast, and/or any other form of information gathering and/or dissemination.

The term "network component," as used herein unless specified otherwise, may refer to a user or network device, or a component, piece, portion, or combination of user or network devices. Examples of network components may include a Static Random Access Memory (SRAM) device or module, a network processor, and a network communication path, connection, port, or cable.

In addition, some embodiments are associated with a "network" or a "communication network". As used herein, the terms "network" and "communication network" may be used interchangeably and may refer to any object, entity, component, device, and/or any combination thereof that permits, facilitates, and/or otherwise contributes to or is associated with the transmission of messages, packets, signals, and/or other forms of information between and/or within one or more network devices. Networks may be or include a plurality of interconnected network devices. In some embodiments, networks may be hard-wired, wireless, virtual, neural, and/or any other configuration of type that is or becomes known. Communication networks may include, for example, one or more networks configured to operate in accordance with the Fast Ethernet LAN transmission standard 802.3-2002® published by the Institute of Electrical and Electronics Engineers (IEEE). In some embodiments, a network may include one or more wired and/or wireless networks operated in accordance with any communication standard or protocol that is or becomes known or practicable.

The term "player," as used herein unless specified otherwise, may refer to any type, quantity, and or manner of entity associated with the play of a game. In some embodiments, a player may comprise an entity (i) conducting play of an online game, (ii) that desires to play a game (e.g., an entity registered and/or scheduled to play and/or an entity having expressed interest in the play of the game—e.g., a spectator) and/or may (iii) that configures, manages, and/or conducts a game. A player may be currently playing a game or have previously played the game, or may not yet have initiated play—i.e., a "player" may comprise a "potential player" (e.g., in general and/or with respect to a specific game). In some embodiments, a player may comprise a user of an interface (e.g., whether or not such a player participates in a game or seeks to participate in the game).

Some embodiments described herein are associated with a "player device" or a "network device". As used herein, a "player device" is a subset of a "network device". The "network device", for example, may generally refer to any device that can communicate via a network, while the "player device" may comprise a network device that is owned and/or operated by or otherwise associated with a player. Examples of player and/or network devices may include, but are not limited to: a Personal Computer (PC), a computer workstation, a computer server, a printer, a scanner, a facsimile machine, a copier, a Personal Digital Assistant (PDA), a storage device (e.g., a disk drive), a hub, a router, a switch, and a modem, a video game console, or a wireless or cellular telephone. Player and/or network devices may, in some embodiments, comprise one or more network components.

An "game event", "event instance", "game instance", "spin" or "turn" is triggered upon an initiation of, or request for, at least one result of the game by a player, such as an actuation of a "start" or "spin" mechanism, which initiation causes an outcome to be determined or generated (e.g., a random number generator is contacted or communicated with to identify, generate or determine a random number to be used to determine a result for the event instance). An event instance or turn may comprise an event instance or turn of a primary game or an event instance or turn of a bonus round, mode or feature of the game.

"Virtual currency" as the term is used herein unless indicated otherwise, refers to an in-game currency that may be used as part of a game or one or more games provided by a game provider as (i) currency for making wagers, and/or (ii) to purchase or access various in-game items, features or powers. References to an "award", "prize" and/or "payout" herein are intended to encompass such in the form of virtual currency, credits, real currency or any other form of value, tangible or intangible.

A "credit balance", as the term is used herein unless indicated otherwise, refers to (i) a balance of currency, whether virtual currency or real currency, usable for making wagers or purchases in the game (or relevant to the game), and/or (ii) another tracking mechanism for tracking a player's success or advancement in a game by deducting therefrom points or value for unsuccessful attempts at advancement and adding thereto points or value for successful attempts at advancement. A credit balance may be increased or replenished with funds external to the game. For example, a player may transfer funds to the credit balance from a financial account or a gaming establishment may add funds to the credit balance due to a promotion, award or gift to the player.

Referring now to the figures, FIG. 1 depicts a block diagram of an example system 100 according to some embodiments. The system 100 may comprise a plurality of player devices 102*a*-102*n* in communication with a game server 110 via a network 104. For purposes of brevity, any or all of the player devices 102*a*-102*n* will be referred to as a player device 102 herein, even though the plurality of player devices 102*a*-102*n* may include different types of player devices (as described below). The game server 110 may also be operable to communicate with or access a database 140 (which may comprise one or more databases and/or tables and which may comprise a storage device distinct from (or be a component of) the game server 110). It should be noted that in some embodiments database 140 may be stored on a game server 110 while in other embodiments database 140 may be stored on another computing device with which game server 110 is operable to communicate in order to at least access the data in database 140 (e.g., another server device remote from game server 140, operable to determine outcomes for an event instance of a game). In some embodiments a processor (e.g., one or more microprocessors, one or more microcontrollers, one or more digital signal processors) of a player device 102 and/or game server 110 may receive instructions (e.g., from a memory or like device), and execute those instructions, thereby performing one or more processes defined by those instructions. Instructions may be embodied in, e.g., one or more computer programs and/or one or more scripts.

In some embodiments a game server 110 and/or one or more of the player devices 102 stores and/or has access to data useful for facilitating play of a game. For example, game server 110 and/or a player device 102 may store (i) one or more probability databases for determining one or more outcome(s) for an event instance, spin or turn of a game, (ii) a current state or status of a game or game session (e.g., a number of spins defined by a bet and a number of spins which have already been executed in order to determine a win result for the bet and the respective outcome(s) of the spins), (iii) one or more user interfaces for use in a game, (iv) one or more game themes for a game and/or (v) profiles or other personal information associated with a player of a game. It should be noted that in some embodiments such data may be stored on the game server 110 and information based on such data may be output to a player device 102 during play of a game (e.g., the player device may function as a client device which accesses game data from a remote server device using a web browser application of the player device). In other embodiments a game program may be downloaded to a local memory of a player device 102 and thus such data may be stored on a player device 102 (e.g., in encrypted or other secure or tamper-resistant form).

A game server 110 may comprise a computing device for facilitating play of a game (e.g., by receiving an input from a player, determining an outcome for a game, causing an outcome of a game to be displayed on a player device, determining a win result for a bet encompassing a plurality of spins or other game events, facilitating a wager and/or a provision of a payout for a game). For example, the game server 110 may comprise a server computer operated by a game provider or another entity (e.g., a social network website not primarily directed at providing games). In some embodiments, the game server may determine an outcome for spin of a game by requesting and receiving such an outcome from another remote server operable to provide such outcomes. In some embodiments, the game server 110 may further be operable to facilitate a game program for a game (e.g., a wagering game). In accordance with some embodiments, in addition to administering or facilitating play of a game, a game server 110 may comprise one or more computing devices responsible for handling online processes such as, but not limited to: serving a website comprising one or more games to a player device and/or processing transactions (e.g., wagers, deposits into financial accounts, managing accounts, controlling games, etc.). In some embodiments, game server 110 may comprise two or more server computers operated by the same entity (e.g., one server being primarily for storing states of games in progress and another server being primarily for storing mechanisms for determining outcomes of games, such as a random number generator).

Turning now to a description of a player device 102, in accordance with some embodiments a player device 102 may comprise a computing device that is operable to execute or facilitate the execution of a game program and used or useful by an online player for accessing an online casino or other electronic (e.g., online) game provider. For example, a player device 102 may comprise a desktop computer, computer workstation, laptop, mobile device, tablet computer, Personal Digital Assistant (PDA) devices, cellular or other wireless telephones (e.g., the Apple™ iPhone™), video game consoles (e.g., Microsoft™ Xbox 360™, Sony™ Playstation™, and/or Nintendo™ Wii™), and/or handheld or portable video game devices (e.g., Nintendo™ Game Boy™ or Nintendo™ DS™). A player device 102 may comprise and/or interface with various components such as input and output devices (each of which is described in detail elsewhere herein) and, in some embodiments, game server 110. A player device 102 may be a dedicated gaming device (e.g., a slot machine) or a non-dedicated gaming device (e.g., an iPad™). It should be noted that a game server 110 may be in communication with a variety of different types of player devices 102.

A player device 102 may be used to play a wagering or non-wagering game (e.g., a social or casual game) over a network and output information relating to the game to players participating in the game (e.g., outcomes for an event instance of the game, qualifying for a bonus round of the game, outcomes determined for a bet, a win result of a bet, credit balance of credits available for play of the game, etc.). Any and all information relevant to any of the aforementioned functions may be stored locally on one or more of the player devices 102 and/or may be accessed using one or more of the player devices 102 (in one embodiments such information being stored on, or provided via, the game server 110). In another embodiment, a player device 102 may store some or all of the program instructions for determining, for example, (i) that an event instance or game instance (e.g., a spin of a virtual roulette game) has been triggered or initiated (and, in some embodiments, communicating such a trigger or initiation to game server 110), (ii) a win result for a bet (e.g., which may be dependent on a plurality of outcomes), and/or (iv) modifying a game interface to reflect events within the game. In some embodiments, the game server 110 may be operable to authorize the one or more player devices 102 to access such information and/or program instructions remotely via the network 104 and/or download from the game server 110 (e.g., directly or via an intermediary server such as a web server) some or all of the program code for executing one or more of the various functions described in this disclosure. In other embodiments, outcome and result determinations may be carried out by the game server 110 (or another server with which the game server 110 communicates) and the player devices 102 may be terminals for displaying to an associated player such outcomes and results and other graphics and data related to a game. For example, in some embodiments a player device may access a server device as a client via a browser on the player device and the player may play a game consistent with at least some embodiments described herein by accessing the game interface using a browser rather than having game logic downloaded to the player device.

It should be noted that the one or more player devices 102 may each be located at the same location as at least one other player device 102 (e.g., such as in a casino or internet café) or remote from all other player devices 102. Similarly, any given player device may be located at the same location as the game server 110 or may be remote from the game server 110. It should further be noted that while the game server 110 may be useful or used by any of the player devices 102 to perform certain functions described herein, the game server 110 need not control any of the player devices 102. For example, in one embodiment the game server 110 may comprise a server hosting a website of an online casino accessed by one or more of the player devices 102 (e.g., via a web browser of the player device).

In one embodiment, a game server 110 may not be necessary or desirable. For example, some embodiments described in this disclosure may be practiced on one or more player devices 102 without a central authority. In such an embodiment, any functions described herein as performed by a game server 110 and/or data described as stored on a game server 110 may instead be performed by or stored on one or more player devices 102. Additional ways of distributing information and program instructions among one or more player devices 102, a game server 110 and/or another server device will be readily understood by one skilled in the art upon contemplation of the present disclosure.

Figure 2:
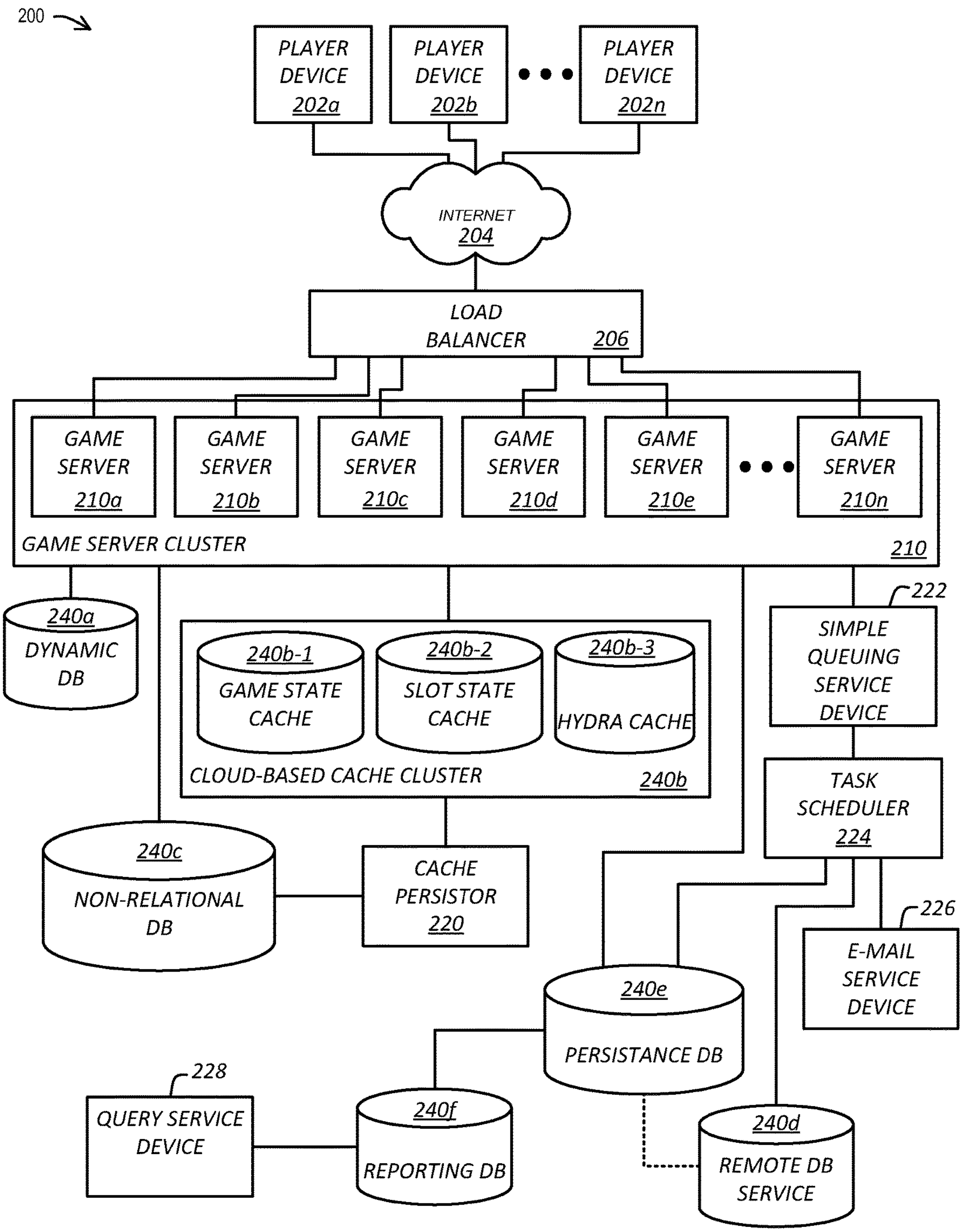
FIG. 2 is a schematic diagram of an embodiment of a gaming platform in accordance with one or more embodiments described herein.

FIG. 2 a block diagram of an example system 200, which is consistent with some embodiments. In accordance with some embodiments, the system 200 may comprise a plurality of player devices 202*a-n*, the Internet 204, a load balancer 206, and/or a game server cluster 210. The game server cluster 210 may, in some embodiments, comprise a plurality of game servers 210*a-n*. In some embodiments, the system 200 may comprise a cache persistor 220, a Simple Queuing Service (SQS) device 222, a task scheduler 224, an e-mail service device 226, and/or a query service device 228. As depicted in FIG. 2, any or all of the various components 202*a-n*, 204, 206, 210*a-n*, 220, 222, 224, 226, 228 may be in communication with and/or coupled to one or more databases 240*a-f*. The system 200 may comprise, for example, a dynamic DataBase (DB) 240*a*, a cloud-based cache cluster 240*b* (e.g., comprising a game state cache 240*b*-1, a slot state cache 240*b*-2, and/or a "hydra" cache 240*b*-3), a non-relational DB 240*c*, a remote DB service 240*d*, a persistence DB 240*e*, and/or a reporting DB 240*f*.

According to some embodiments, any or all of the components 202*a-n*, 204, 206, 210*a-n*, 220, 222, 224, 226, 228, 240*a-f* of the system 200 may be similar in configuration and/or functionality to any similarly named and/or numbered components described herein. Fewer or more components 202*a-n*, 204, 206, 210*a-n*, 220, 222, 224, 226, 228, 240*a-f* (and/or portions thereof) and/or various configurations of the components 202*a-n*, 204, 206, 210*a-n*, 220, 222, 224, 226, 228, 240*a-f* may be included in the system 200 without deviating from the scope of embodiments described herein. While multiple instances of some components 202*a-n*, 210*a-n*, 240*a-f* are depicted and while single instances of other components 204, 206, 220, 222, 224, 226, 228 are depicted, for example, any component 202*a-n*, 204, 206, 210*a-n*, 220, 222, 224, 226, 228, 240*a-f* depicted in the system 200 may comprise a single device, a combination of devices and/or components 202*a-n*, 204, 206, 210*a-n*, 220, 222, 224, 226, 228, 240*a-f*, and/or a plurality of devices, as is or becomes desirable and/or practicable. Similarly, in some embodiments, one or more of the various components 202*a-n*, 204, 206, 210*a-n*, 220, 222, 224, 226, 228, 240*a-f* may not be needed and/or desired in the system 200.

According to some embodiments, the player device 202*a-n* may be utilized to access (e.g., via the Internet 204 and/or one or more other networks not explicitly shown) content provided by the game server cluster 210. The game server cluster 210 may, for example, provide, manage, host, and/or conduct various online and/or otherwise electronic games such as online bingo, slots, poker, and/or other games of chance, skill, and/or combinations thereof. In some embodiments, the various game servers 210*a-n* (virtual and/or physical) of the game server cluster 210 may be configured to provide, manage, host, and/or conduct individual instances of available game types. A first game server 210*a*, for example, may host a first particular instance of an online roulette game (or tournament), a second game server 210*c* may host a second particular instance of an online roulette game (or tournament), a third game server 210*c* may facilitate an online poker tournament, and/or a fourth game server 210*d* may provide an online slots game.

In some embodiments, the player devices 202*a-n* may comprise various components (hardware, firmware, and/or software; not explicitly shown) that facilitate game play and/or interaction with the game server cluster 210. The player device 202*a-n* may, for example, comprise a gaming client such as a software application programmed in Adobe® Flash® and/or HTML 5 that is configured to send requests to, and receive responses from, one or more of the game servers 210*a-n* of the game server cluster 210. In some embodiments, such an application operating on and/or via the player devices 202*a-n* may be configured in Model-View-Controller (MVC) architecture with a communication manager layer responsible for managing the requests to/responses from the game server cluster 210. In some embodiments, one or more of the game servers 210*a-n* may also or alternatively be configured in a MVC architecture with a communication manager and/or communications management layer. In some embodiments, communications between the player devices 202*a-n* and the game server cluster 210 may be conducted in accordance with the HyperText Transfer Protocol (HTTP) version 1.1 (HTTP/1.1) as published by the Internet Engineering Taskforce (IET) and the World Wide Web Consortium (W3C) in RFC 2616 (June 1999).

According to some embodiments, communications between the player devices 202*a-n* and the game server cluster 210 may be managed and/or facilitated by the load balancer 206. The load balancer 206 may, for example, route communications from player devices 202*a-n* to one or more of the specific game servers 210*a-n* depending upon various attributes and/or variables such as bandwidth availability (e.g., traffic management/volumetric load balancing), server load (e.g., processing load balancing), server functionality (e.g., contextual awareness/availability), and/or player-server history (e.g., session awareness/stickiness). In some embodiments, the load balancer 206 may comprise one or more devices and/or services provided by a third-party (not shown). The load balancer 206 may, for example, comprise an Elastic Load Balancer (ELB) service provided by Amazon® Web Services, LLC of Seattle, Wash. According to some embodiments, such as in the case that the load balancer 206 comprises the ELB or a similar service, the load balancer 206 may manage, set, determine, define, and/or otherwise influence the number of game servers 210*a-n* within the game server cluster 210. In the case that traffic and/or requests from the player devices 202*a-n* only require the first and second game servers 210*a-b*, for example, all other game servers 210*c-n* may be taken off-line, may not be initiated and/or called, and/or may otherwise not be required and/or utilized in the system 200. As demand increases (and/or if performance, security, and/or other issues cause one or more of the first and second game servers 210*a-b* to experience detrimental issues), the load balancer 206 may call and/or bring online one or more of the other game servers 210*c-n* depicted in FIG. 2. In the case that each game server 210*a-n* comprises an instance of an Amazon® Elastic Compute Cloud (EC2) service, the load balancer 206 may add or remove instances as is or becomes practicable and/or desirable.

In some embodiments, the load balancer 206 and/or the Internet 204 may comprise one or more proxy servers and/or devices (not shown in FIG. 2) via which communications between the player devices 202*a-n* and the game server cluster 210 are conducted and/or routed. Such proxy servers and/or devices may comprise one or more regional game hosting centers, for example, which may be geographically dispersed and addressable by player devices 202*a-n* in a given geographic proximity. In some embodiments, the proxy servers and/or devices may be located in one or more geographic areas and/or jurisdictions while the game server cluster 210 (and/or certain game servers 210*a-n* and/or groups of game servers 210*a-n* thereof) is located in a separate and/or remote geographic area and/or jurisdiction.

According to some embodiments, for some game types the game server cluster 210 may provide game outcomes to a controller device (not separately shown in FIG. 2) that times the release of game outcome information to the player devices 202*a-n* such as by utilizing a broadcaster device (also not separately shown in FIG. 2) that transmits the time-released game outcomes to the player devices 202*a-n* (e.g., in accordance with the Transmission Control Protocol (TCP) and Internet Protocol (IP) suite of communications protocols (TCP/IP), version 4, as defined by "Transmission Control Protocol" RFC 793 and/or "Internet Protocol" RFC 791, Defense Advance Research Projects Agency (DARPA), published by the Information Sciences Institute, University of Southern California, J. Postel, ed. (September 1981)).

In some embodiments, the game server cluster 210 (and/or one or more of the game servers 210*a-n* thereof) may be in communication with the dynamic DB 240*a*. According to some embodiments, the dynamic DB 240*a* may comprise a dynamically-scalable database service such as the DynamoDB™ service provided by Amazon® Web Services, LLC. The dynamic DB 240*a* may, for example, store information specific to one or more certain game types (e.g., a reeled slots themed game) provided by the game server cluster 210 such as to allow, permit, and/or facilitate reporting and/or analysis of such information.

According to some embodiments, the game server cluster 210 (and/or one or more of the game servers 210*a-n* thereof) may be in communication with the cloud-based cache cluster 240*b*. Game state information from the game server cluster 210 may be stored in the game state cache 240*b*-1, for example, slot state (e.g., slot-game specific state) data may be stored in the slot state cache 240*b*-2, and/or other game and/or player information (e.g., progressive data, player rankings, audit data) may be stored in the hydra cache 240*b*-3. In some embodiments, the cache persistor 220 may move and/or copy data stored in the cloud-based cache cluster 240*b* to the non-relational DB 240*c*. The non-relational DB 240*c* may, for example, comprise a SimpleDB™ service provided by Amazon® Wed Services, LLC. According to some embodiments, the game server cluster 210 may generally access the cloud-based cache cluster 240*b* as-needed to store and/or retrieve game-related information. The data stored in the cloud-based cache cluster 240*b* may generally comprise a subset of the newest or freshest data, while the cache persistor 220 may archive and/or store or move such data to the non-relational DB 240*c* as it ages and/or becomes less relevant (e.g., once a player logs-off, once a game session and/or tournament ends). The game server cluster 210 may, in accordance with some embodiments, have access to the non-relational DB 240*c* as-needed and/or desired. The game servers 210*a-n* may, for example, be initialized with data from the non-relational DB 240*c* and/or may store and/or retrieve low frequency and/or low priority data via the non-relational DB 240*c*.

In some embodiments, the SQS device 222 may queue and/or otherwise manage requests, messages, events, and/or other tasks or calls to and/or from the server cluster 210. The SQS device 222 may, for example, prioritize and/or route requests between the game server cluster 210 and the task scheduler 224. In some embodiments, the SQS device 222 may provide mini-game and/or tournament information to the server cluster 210. According to some embodiments, the task scheduler 224 may initiate communications with the SQS device 222, the e-mail service provider 226 (e.g., providing e-mail lists), the remote DB service 240*d* (e.g., providing inserts and/or updates), and/or the persistence DB 240*e* (e.g., providing and/or updating game, player, and/or other reporting data), e.g., in accordance with one or more schedules.

According to some embodiments, the persistence DB 240*e* may comprise a data store of live environment game and/or player data. The game server cluster 210 and/or the task scheduler 224 or SQS device 222 may, for example, store game and/or player data to the persistence DB 240*e* and/or may pull and/or retrieve data from the persistence DB 240*e*, as-needed and/or desired. The server cluster 210 may, according to some embodiments, provide and/or retrieve spin and/or other game event info and/or configuration information via the persistence DB 240*e*.

In some embodiments, the reporting DB 240*f* may be created and/or populated based on the persistence DB 240*e*. On a scheduled and/or other basis, for example, a data transformation and/or mapping program may be utilized to pull data from the live environment (e.g., the persistence DB 240*e*) into the reporting DB 240*f*. The query service 228 may then be utilized, for example, to query the reporting DB 240*f*, without taxing the live environment and/or production system directly accessible by the game server cluster 210.

Figure 3:
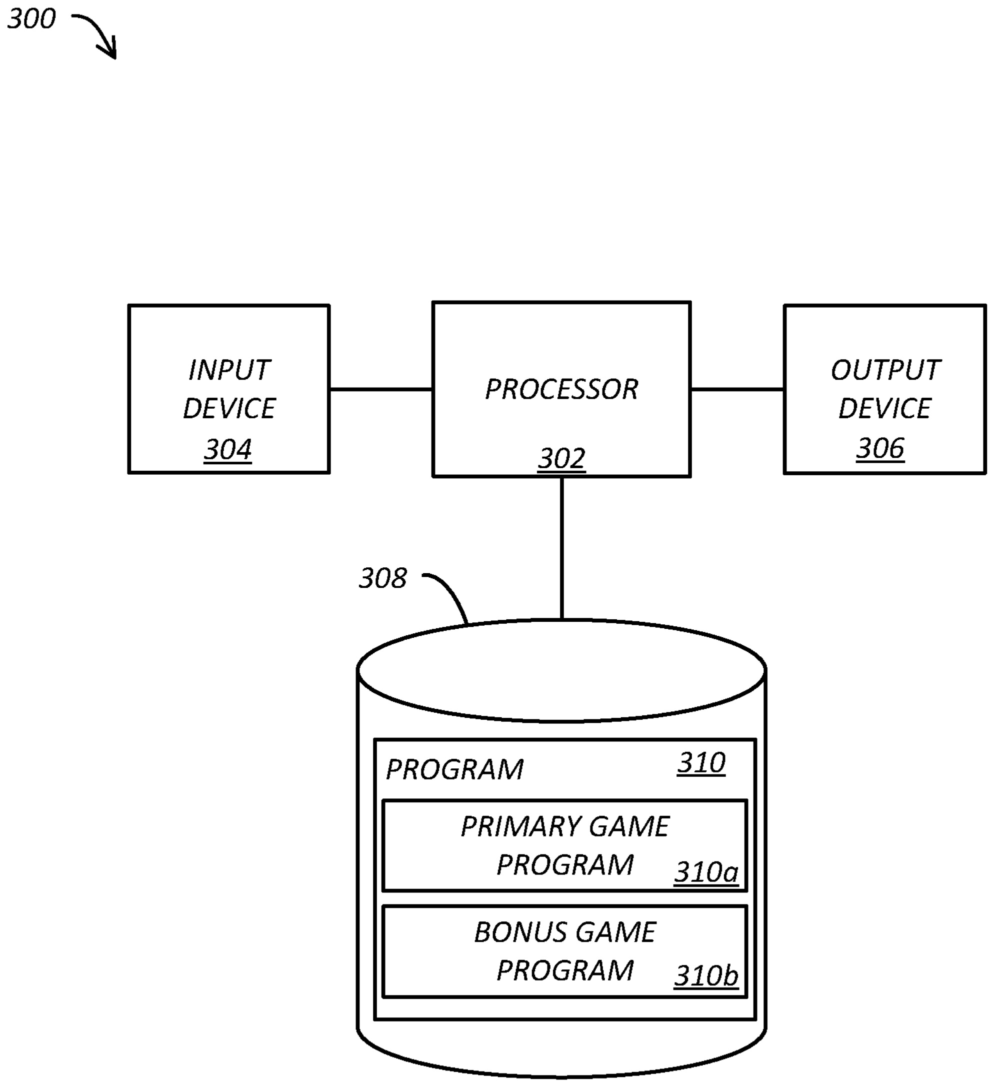
FIG. 3 is a block diagram of an embodiment of a computing device useful in a system according to one or more embodiments described herein.

FIG. 3 is a block diagram of an apparatus 300 according to some embodiments. In some embodiments, the apparatus 300 may be similar in configuration and/or functionality to any of the player devices 102, the game server 110 and/or another server device operable to facilitate the embodiments described herein. The apparatus 300 may, for example, execute, process, facilitate, and/or otherwise be associated with any of the processes described herein.

In some embodiments, the apparatus 300 may comprise a processor 302, an input device 304, an output device 306 and/or a memory device 308. Fewer or more components and/or various configurations of the components 302, 304, 306 and/or 308 may be included in the apparatus 300 without deviating from the scope of embodiments described herein. In accordance with some embodiments, one or more of the components 302, 304, 306 and/or 308 may be components of a game controller of the apparatus 300. A game controller may comprise a combination of hardware and software specialized for carrying out functionality in accordance with at least some embodiments described herein.

According to some embodiments, the processor 302 may be or include any type, quantity, and/or configuration of processor that is or becomes known. The processor 302 may comprise, for example, an Intel® IXP 2800 network processor or an Intel® XEON™ Processor coupled with an Intel® E7501 chipset. In some embodiments, the processor 302 may comprise multiple inter-connected processors, microprocessors, and/or micro-engines. According to some embodiments, the processor 302 (and/or the apparatus 300 and/or other components thereof) may be supplied power via a power supply (not shown) such as a battery, an Alternating Current (AC) source, a Direct Current (DC) source, an AC/DC adapter, solar cells, and/or an inertial generator. In the case that the apparatus 302 comprises a server such as a blade server, necessary power may be supplied via a standard AC outlet, power strip, surge protector, and/or Uninterruptible Power Supply (UPS) device.

In some embodiments, the input device 304 and/or the output device 306 are communicatively coupled to the processor 302 (e.g., via wired and/or wireless connections and/or pathways) and they may generally comprise any types or configurations of input and output components and/or devices that are or become known, respectively.

The input device 304 may comprise, for example, a keyboard that allows an operator of the apparatus 300 to interface with the apparatus 200 (e.g., by a player, an employee or other worker affiliated with either an online casino or other entity operating a system which provides games to players). In some embodiments, the input device 304 may comprise a mechanism configured to indicate to a remote server device an initiation or triggering of an event instance (e.g., that a player has actuated a "reel spin" mechanism (e.g., a "soft" or virtual button on an online game interface) and thus initiated a new spin of a reels-based game), such information being provided to the apparatus 300 and/or the processor 302. In such embodiments, the input device may comprise a key on a keyboard of the apparatus 300 or a touch-sensitive screen of a device. Other examples of input devices include, but are not limited to: a game controller and/or gamepad, a bar-code scanner, a magnetic stripe reader, a pointing device (e.g., a computer mouse, touchpad, and/or trackball), a point-of-sale terminal keypad, a microphone, an infrared sensor, a sonic ranger, a computer port, a video camera, a motion detector, a digital camera, a network card, a Universal Serial Bus (USB) port, a GPS receiver, a Radio Frequency Identification (RFID) receiver, a RF receiver, a thermometer, a pressure sensor, and a weight scale or mass balance.

The output device 306 may, according to some embodiments, comprise a display screen and/or other practicable output component and/or device that is operable to output information. The output device 306 may, for example, comprise a display screen via which are output outcomes, instructions, guidance, questions or information to a player of a game. For example, the output device may output a game interface for a game which indicates an outcome of an event instance of the game, such as an outcome for a spin of a roulette wheel and/or a win result for a bet dependent on a plurality of outcomes. Some additional examples of output devices that may be useful in some embodiments include a Cathode Ray Tube (CRT) monitor, a Liquid Crystal Display (LCD) screen, a Light Emitting Diode (LED) screen, a printer, an audio speaker, an Infra-red Radiation (IR) transmitter, an RF transmitter, and/or a data port. According to some embodiments, the input device 304 and/or the output device 306 may comprise and/or be embodied in a single device such as a touch-screen display or screen.

In some embodiments, the apparatus 300 may comprise any type or configuration of communication device (not shown) that is or becomes known or practicable. For example, the apparatus 300 may include a communication device such as a Network Interface Controller (NIC), a telephonic device, a cellular network device, a router, a hub, a modem, and/or a communications port or cable. In some embodiments, the communication device may be coupled to provide data to a telecommunications device. The communication device may, for example, comprise a cellular telephone network transmission device that sends signals (e.g., an initiation of an event instance) to a server (e.g., game server 110) in communication with a plurality of player devices 102. According to some embodiments, the communication device may also or alternatively be coupled to the processor 302. In some embodiments, the communication device may comprise an IR, RF, Bluetooth™, and/or Wi-Fi® network device coupled to facilitate communications between the processor 202 and another device.

The memory device 308 may comprise any appropriate information storage device that is or becomes known or available, including, but not limited to, units and/or combinations of magnetic storage devices (e.g., a hard disk drive), optical storage devices, and/or semiconductor memory devices such as Random Access Memory (RAM) devices, Read Only Memory (ROM) devices, Single Data Rate Random Access Memory (SDR-RAM), Double Data Rate Random Access Memory (DDR-RAM), and/or Programmable Read Only Memory (PROM).

The memory device 308 may, according to some embodiments, store a program 310 for facilitating one or more of the embodiments described herein, which program may include a primary game program **310*a* for facilitating a primary aspect of a game and a bonus game program 310*b* for facilitating a bonus round of the game, which may be relevant to some embodiments. In some embodiments, the primary game program 310*a* and/or the bonus round program 310*b* may be utilized by the processor 302 to provide output information via the output device 306**.

In some embodiments, additional programs or software modules may be stored in memory device 308 or otherwise accessible to processor 302. In some embodiments, one or more of the primary game program **310*a* and the bonus round program 310*b* may comprise various sub-programs, sub-routines or software modules for facilitating different functionality. For example, any of an additional program, program 310*a* and/or program 310*b* may be a stand-alone program or may be part of a program, or set of programs providing various services to a user. For example the apparatus 300 may be facilitating a game event and within a program 310*a* or 310*b*, a section or module is provided to facilitate a multi-spin roulette wager, which section is executed at a relevant time. In some embodiments, the memory device 308 may store an additional program which is called by the primary game program 310*a* or the bonus round program 310*b* when required such that the same additional program can be used by multiple programs. For example, the memory device 308** may store a "game engine" program to provide core services which are utilized by a number of individual game programs to save duplication of software code.

The apparatus 300 may function as a computer terminal and/or server of an online casino or other entity operating to provide online games, receive and/or manage information related to online games. In some embodiments, the apparatus 300 may comprise a web server and/or other server device operable to accept wagers and determine random numbers based upon which outcomes for wagering games are determined (e.g., such that a player device may access the game facilitated by the apparatus 300 using a web browser stored on the player device). In some embodiments, the apparatus 300 may comprise an apparatus that is operable to interact with a player of an online game. In some embodiments, apparatus 300 may comprise a plurality of devices working together to accomplish the functionality described herein with respect to FIG. 3.

Any or all of the exemplary instructions and data types described herein and other practicable types of data may be stored in any number, type, and/or configuration of memory devices that is or becomes known. The memory device 308 may, for example, comprise one or more data tables or files, databases, table spaces, registers, and/or other storage structures. In some embodiments, multiple databases and/or storage structures (and/or multiple memory devices 308) may be utilized to store information associated with the apparatus 300. According to some embodiments, the memory device 308 may be incorporated into and/or otherwise coupled to the apparatus 300 (e.g., as shown) or may simply be accessible to the apparatus 200 (e.g., externally located and/or situated).

Figure 4A:
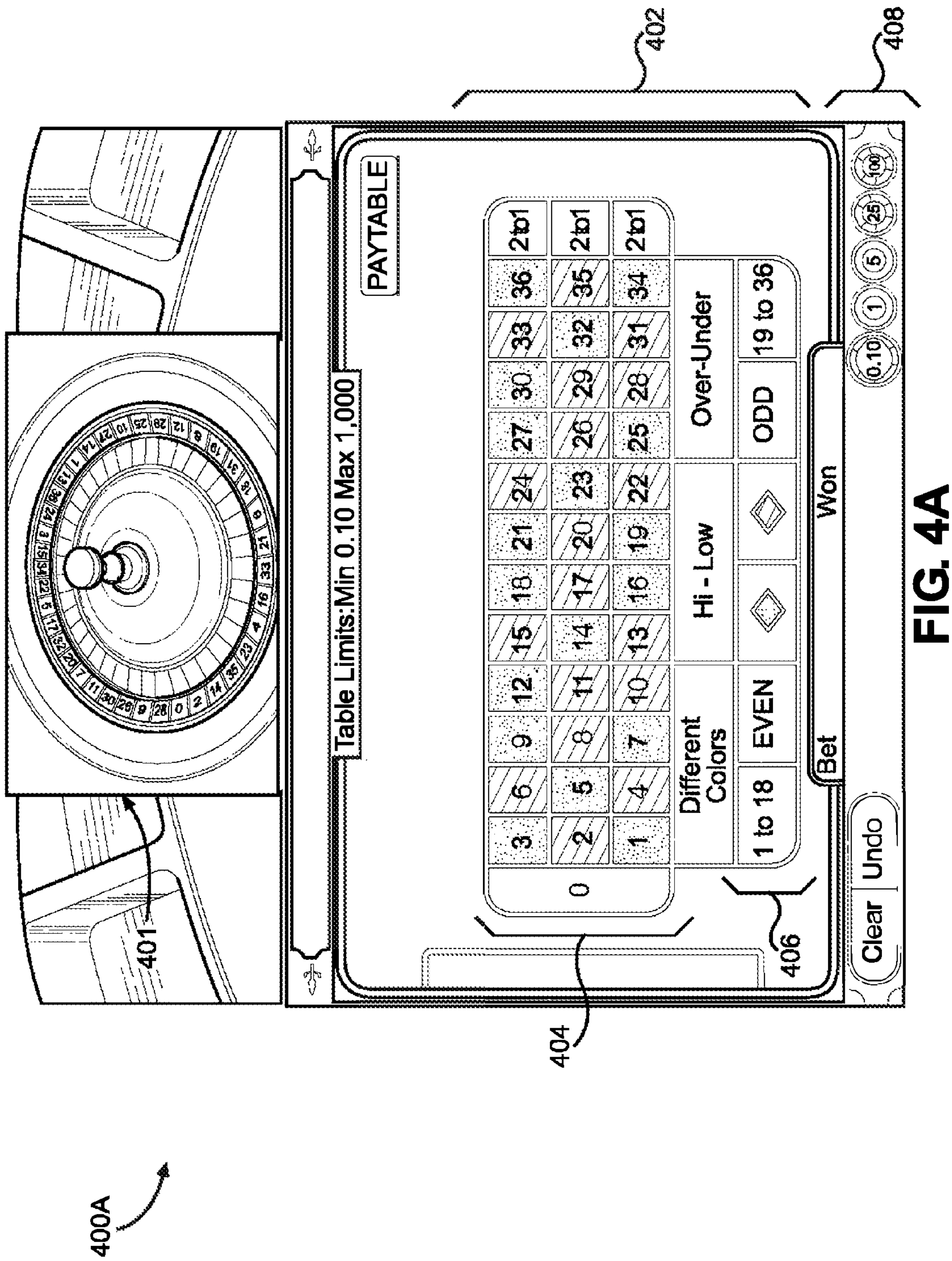
FIGS. 4A-4E illustrate a graphical user interface for facilitating an electronic roulette game, as it is modified to indicate progress in a game event, in accordance with some embodiments described herein.
Figure 4B:
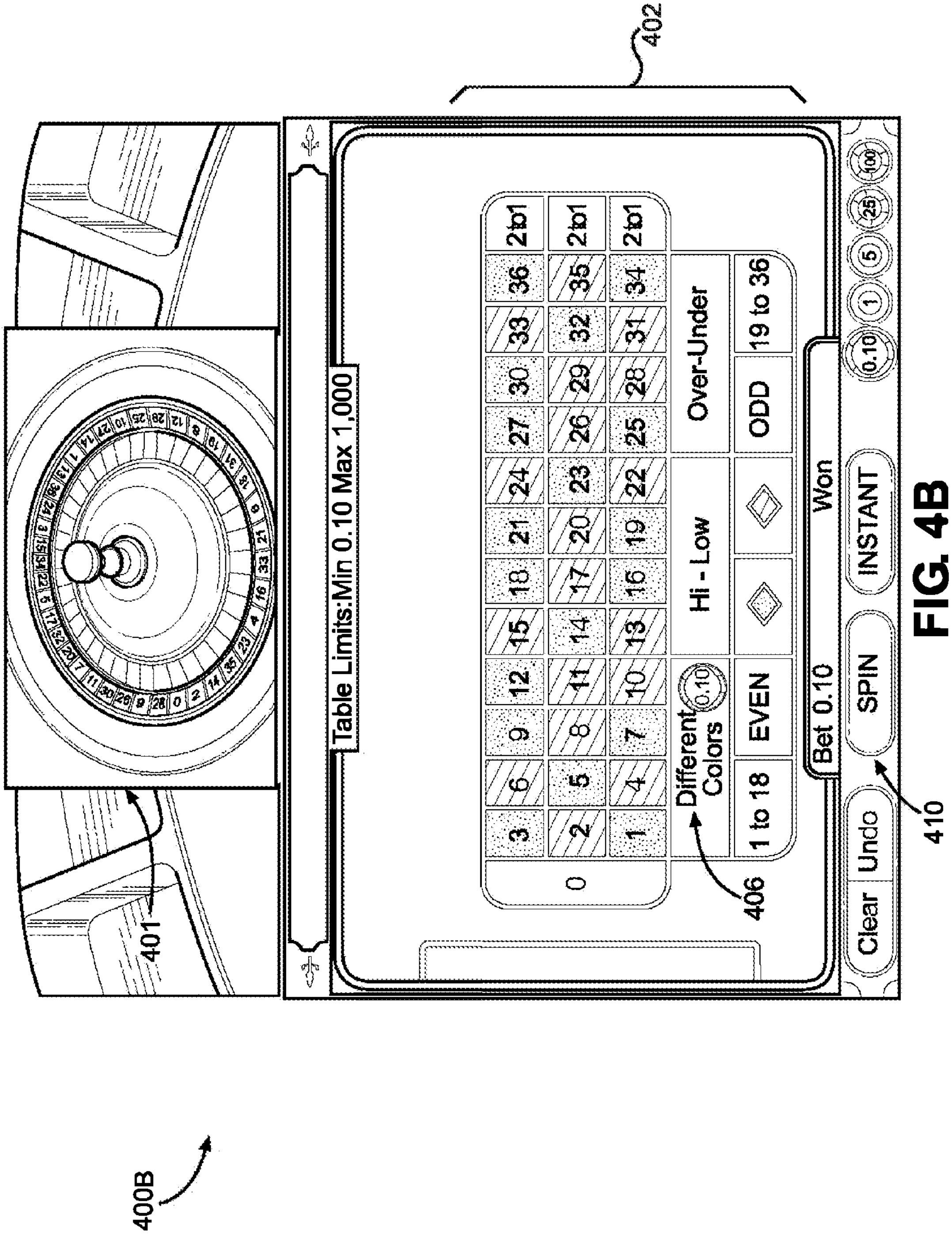

Referring now to FIGS. 4A-4E, consistent with one embodiment there is provided a graphical user interface (GUI) 400 (referred to as GUI 400A with respect to FIG. 4A, GUI 400B with respect to FIG. 4B, etc.). As is well known, graphical user interfaces are arranged to display information regarding a program, software application or other element associated with a computing device. In accordance with one embodiment, the GUI 400 is associated with a program comprising one or more sub-routines, modules or functions. In one embodiment, GUI 400 is associated with a program for facilitating an electronic roulette game playable by a user via a player device (e.g., a mobile device such as a smartphone or tablet computer). For example, GUI 400 may be associated with program 310 (FIG. 3), as described in more detail herein. In one more specific example, in some embodiments a player device may access a server device as a client via a browser on the player device and the player may play a game consistent with at least some embodiments described herein by accessing the game interface using a browser rather than having game logic downloaded to the player device. Thus, in some embodiments GUI 400 may comprise a game interface output in a display of a player device via a web browser of the player device.

In accordance with some embodiments, GUI 400 may be arranged to display information associated with a program for facilitating an electronic roulette game and permit interaction with (e.g. provide input to the program), whether directly or indirectly, the computing device which is running or performing the program. In one embodiment, the GUI 400 comprises a mechanism for one or more computing devices to output game data to a player via a display of a player device (e.g., by displaying the GUI 400 via a web browser of the player device) and/or receive data from a player, and thereby perform one or more programs or sub-routines for facilitating an electronic roulette game. For example, some elements of the GUI 400 may comprise input mechanisms (e.g., virtual buttons actuatable by the player via a cursor or via a touch if the GUI 400 is being displayed via a touchscreen of a player device) and the inputs provided by the player to the GUI 400 may be transmitted to the computing device (e.g., apparatus 300) which is operable to determine data and progress in the game based on the inputs (e.g., a computing device operable to perform process 500, described herein). GUI 400 will initially be described with respect to FIG. 4A but many elements of GUI 400A of FIG. 4A are also included in FIGS. 4B-4E (and therefore in GUI 400B-400E) and it should be understood that the descriptions of the elements common to the representations of GUI 400 in FIGS. 4A-4E may be applied to each such figure without needing to be repeated with respect to each individual figure. An element which is common among the FIGS. 4A-4E is labelled with the same reference numeral in each figure.

In accordance with one embodiment, the GUI 400 may comprise a plurality of windows or areas of a variety of shapes and sizes (which shapes and sizes may be modified during a course of a game event, to allow for clearer representations of information to a player). a first window 401 in which there is displayed a representation of a roulette wheel (e.g., a virtual roulette wheel which may be animated to illustrate a spinning thereof and an animation of a virtual ball landing in a particular portion of the virtual wheel). In accordance with some embodiments, GUI 400 also includes a second window or area 402 in which is displayed additional information regarding game outcomes and available game choices (e.g., available wagers, available wagering chips or wager amounts, etc.) to a player. In one example embodiment, window 402 may comprise (i) a first sub-area 404 which outputs an indication of numbers (and corresponding colors, indicated by different background shading in each color) on which a player may wager; (ii) a second sub-area 406 which outputs an indication of a plurality of different multi-spin wagers on which a player may wager ("Different Colors", "Hi-Lo" and "Over-Under") as well as other wagers which have a relatively higher odds of winning ("1-18", "Even", "Red" (indicated by dotted background), "Black" (indicated by hashed lined background), "Odd" and "19-36").

In the example embodiment of FIGS. 4A-4E, GUI 400 also includes a third sub-area 408 which includes the different amounts of wagers (each available wager amount represented by a different denomination virtual chip) the player may place. It should be noted that while the example embodiments illustrated in FIGS. 4A-4E allow a player to wager on either a traditional single spin wager (e.g., on a particular number, that the next spin outcome will be between 1 and 18, will be an even number, etc.) or a multi-spin wager as described herein. In other embodiments, a roulette game consistent with embodiments described herein may allow wagers only on multi-spin wagers. Further, although only three particular types of multi-spin wagers are illustrated in FIGS. 4A-4B, any number and type of multi-spin wager may be made available, as desired.

Turning now to FIG. 4B, illustrated therein is a GUI 400B which illustrates how the GUI 400 may appear once a player has selected a multi-spin wager. As illustrated in area 406 and in accordance with the example which will be used to illustrate some embodiments described herein, a player has selected the "Different Colors" multi-spin wager and has wagered a chip valued at 0.10 units (e.g., 0.10 dollars, pounds, yen or other currency, depending on the jurisdiction in which the game is implemented). After selecting a wager amount (e.g., by first clicking on the desired wager amount chip in area 408 and then clicking on the desired type of wager), the player may initiate a new game event or result determination by selecting one of the options in area 410. In the example embodiments of FIGS. 4A-4E, the player may initiate a new game event or result determination by selecting either the "Spin" option (which causes the roulette wheel representation in area 401 to become animated and show an outcome for the game event) or the "Instant" option (which outputs an outcome for the game event without an animation of the wheel spinning).

Figure 4C:
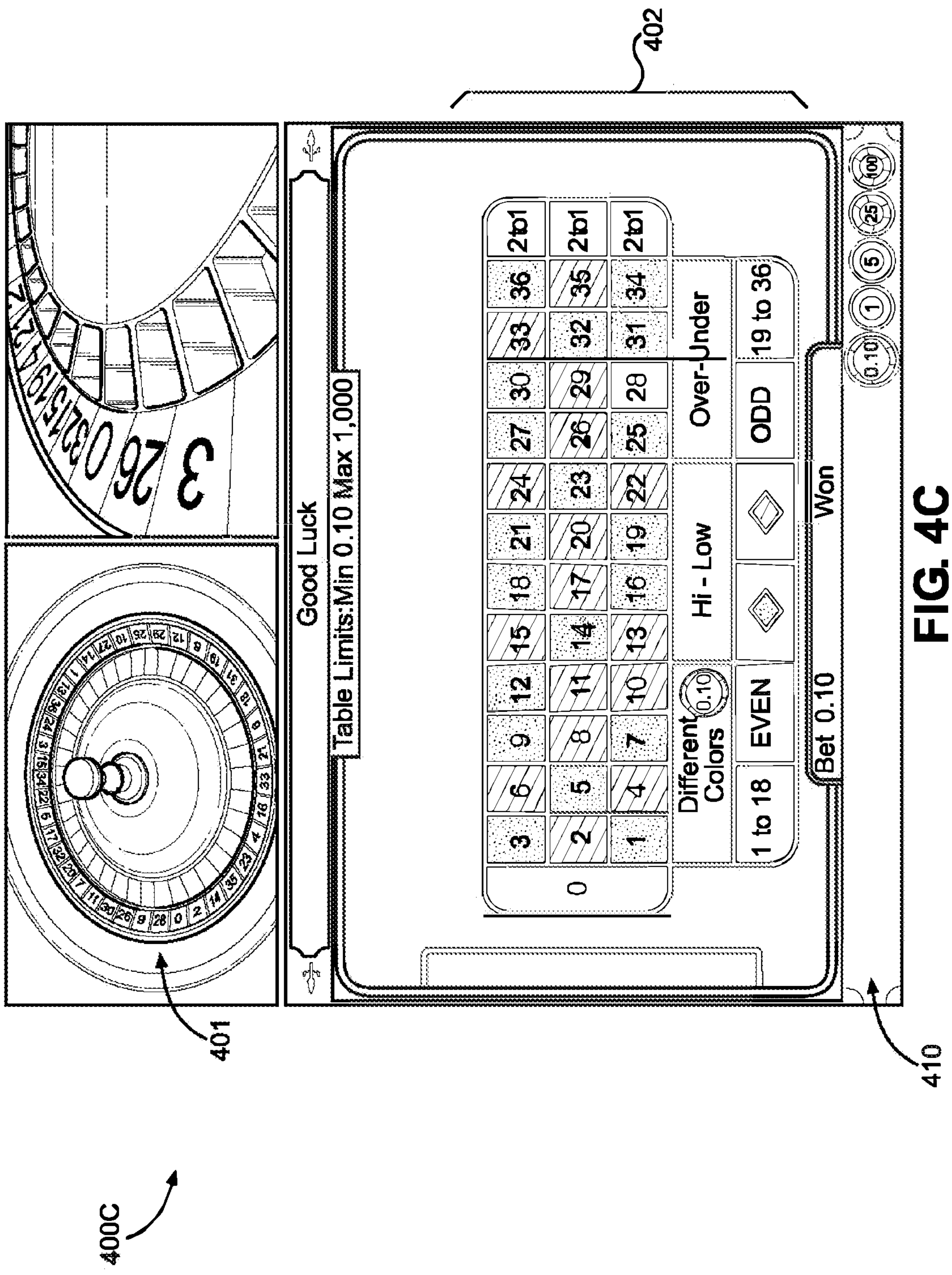

Turning now to FIG. 4C, illustrated therein is a progression of the game from that shown in FIG. 4B. Assuming the player of FIG. 4B selected the "Spin" option in area 410, area 401 now shows a new window in which an animation of a spinning roulette wheel is output. Area 410 no longer includes the "Spin" and "Instant" options because a new wager or command to determine a result for the game event will not be accepted while the previously requested result is being determined and/or an outcome corresponding to it is being output.

Figure 4D:
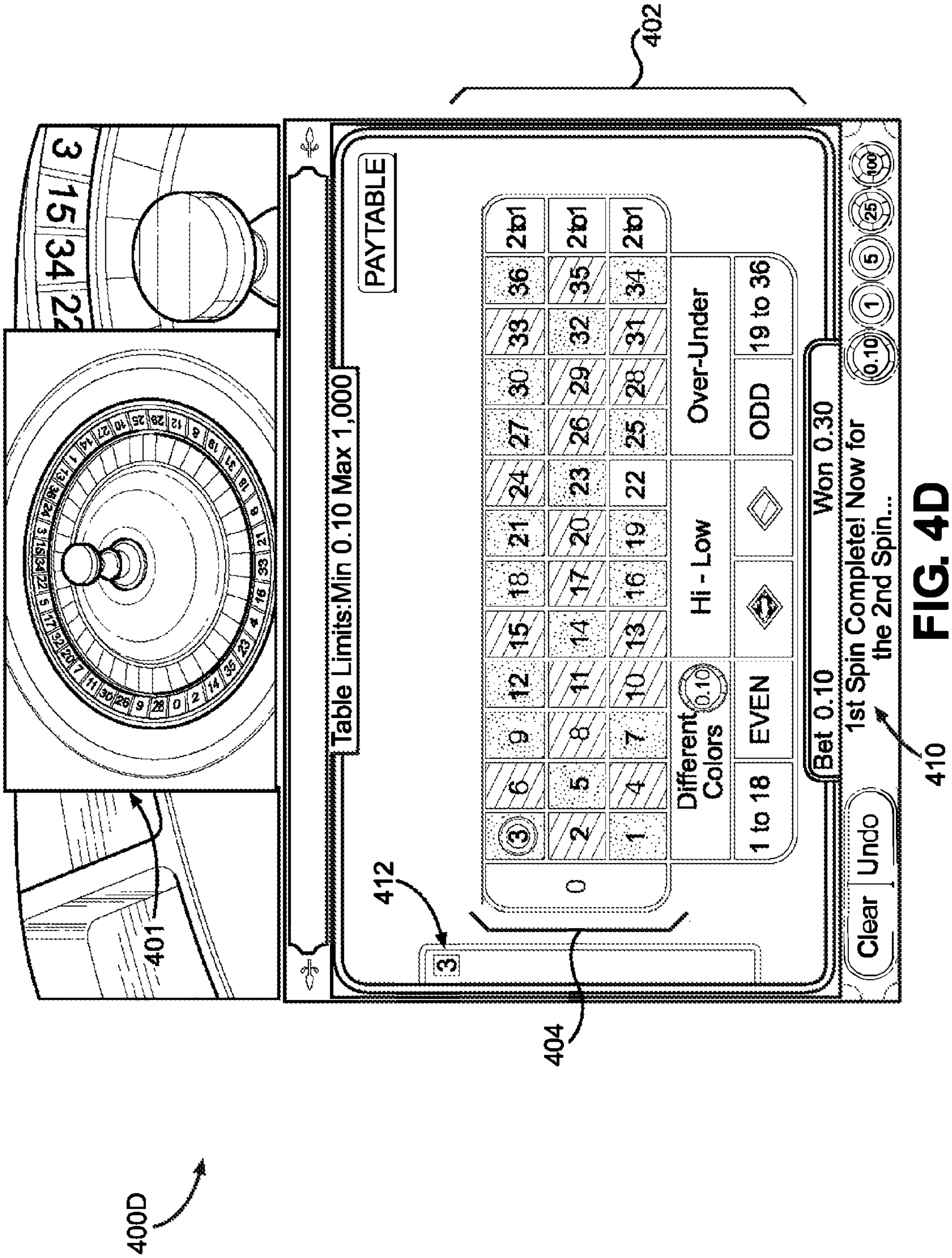

Turning now to FIG. 4D, illustrated therein is a progression of the game from that shown in FIG. 4C. In particular, it is shown that the outcome for the first spin of the multi-spin wager is a "red 3". This outcome is noted in area 412. Area 410 indicates a message to the player, namely that the first outcome of the multi-spin wager has been resolved and it is now time to resolve the second outcome. In accordance with some embodiments, the second spin for the multi-spin wager is initiated automatically on behalf of the player once the first spin is resolved, without requiring any additional input from the player.

Figure 4E:
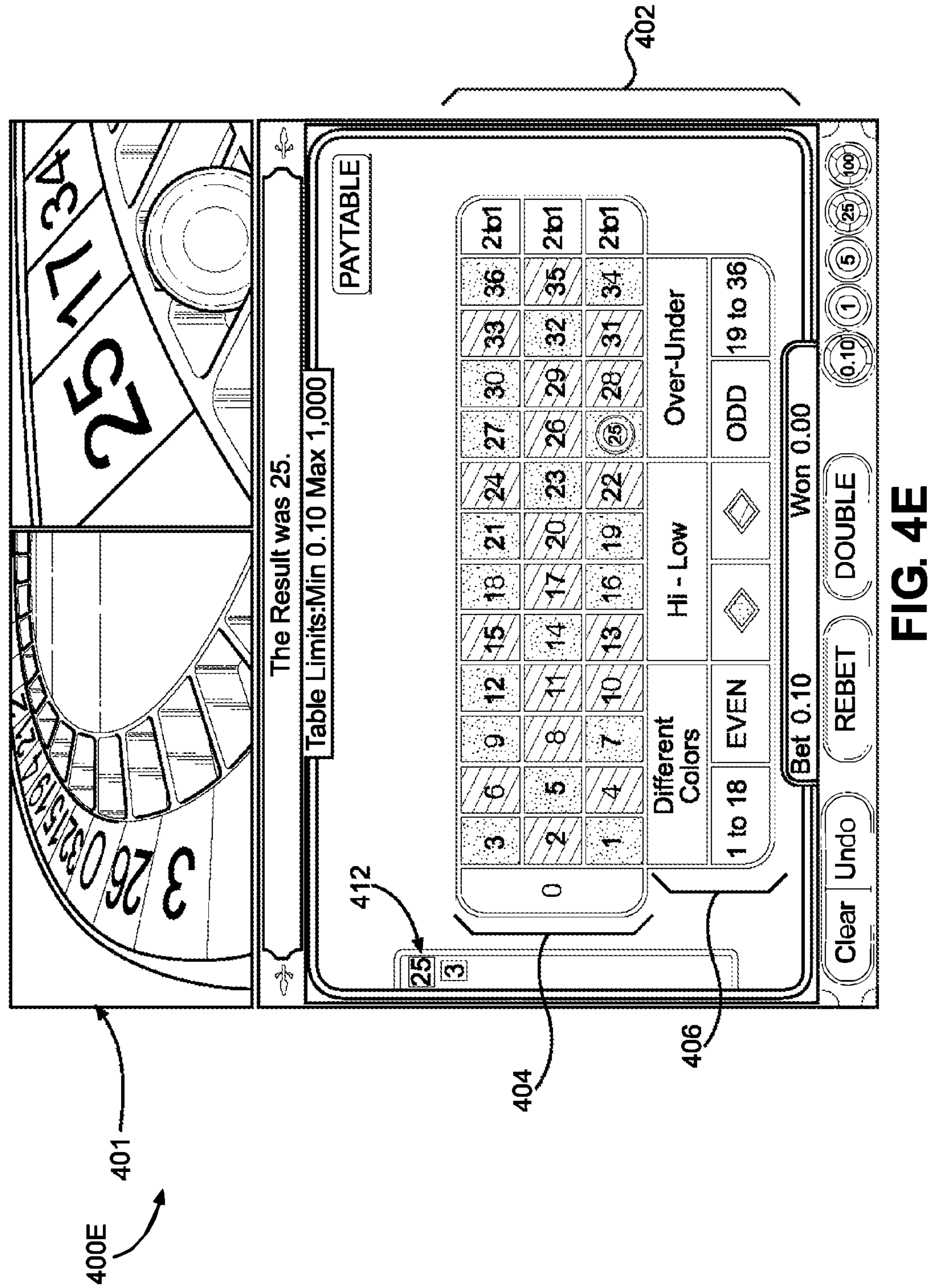

Turning now to FIG. 4E, illustrated therein is a progression of the game from that shown in FIG. 4D. In particular, GUI 400E illustrates that the outcome for the second spin is a "red 25." Area 412 indicates both the "red 3" that was the outcome of the first spin of the multi-spin wager and the "red 25" that was the outcome of the second spin of the multi-spin wager. Since both the first outcome and the second outcome were red numbers, the player has not won the "Different Colors" wager and the player's wager on the "Different Colors" wager is no longer shown in area 406.

In accordance with some embodiments, GUI 400 may include one or more additional elements which permit interaction with an application or function being performed by an associated computing device. For example, GUI 400 may include one or more interactive elements for (i) accessing a payout schedule or rules of the game, (ii) allowing a player to undo or re-bet a previously placed wager, or (iii) causing the computing device to output (e.g., display via a web browser of a mobile device) information, launch a sub-routine or application (e.g., obtain at least one output from a random number generator for use in determining a result for a multi-spin wager) and/or receive player selections of parameters for the game (e.g., a type of wager, denomination amount, etc.).

Figure 5:
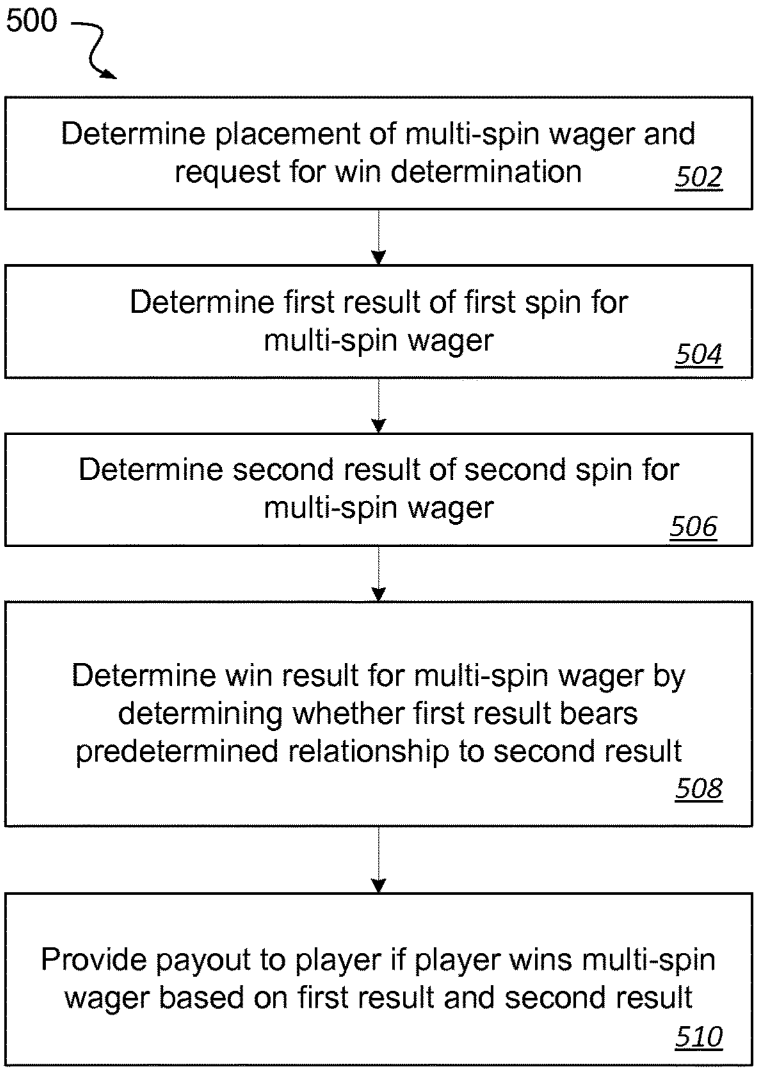
FIG. 5 is a flowchart illustrating a process according to one or more embodiments described herein.

Turning now to FIG. 5, illustrated therein is a process 500 for implementing some of the embodiments described herein. The process 500 may comprise respective processes for implementing the multi-spin wager for a roulette game described herein. The process 500 may be performed, for example, by at least one of a server device operable to facilitate an electronic (e.g., online) roulette game and/or a player device enabling a player to play the electronic (e.g., online) roulette game. For example, the process 500 may be performed by at least one of (i) a player device 102 (FIG. 1); (ii) a game server 110 (FIG. 1); (iii) a player device 202 (FIG. 2); (iv) a game server 210 (FIG. 2); and (v) apparatus 300 (FIG. 3). It should be noted that additional and/or different steps may be added to those depicted and that not all steps depicted are necessary to any embodiment described herein. The process 500 is an example process of how some embodiments described herein may be implemented, and should not be taken in a limiting fashion. A person of ordinary skill in the art, upon contemplation of the embodiments described herein, may make various modifications to process 500 without departing from the spirit and scope of the embodiments in the possession of applicants.

The process 500 will be described with reference to FIGS. 4A-4E, which comprise example user interfaces which may be output to a player in accordance with some embodiments described herein and facilitate the implementation of process 500.

Turning now to FIG. 5, process 500 begins in step 502 with detecting a placement of a multi-spin wager and request for a win determination for the multi-spin wager (e.g., an initiation of at least one spin of a virtual roulette wheel to determine (or output) the win result for the multi-spin wager). For example step 502 may comprise determining that a player has selected a particular type of multi-spin wager from a menu of available multi-spin wagers output to the player and has actuated a mechanism for initiating the win determination for the multi-spin wager or receiving a request from a player device for win determination of a multi-spin wager. In a more particular example, and with reference to FIG. 4B, step 502 may comprise determining that a particular type of multi-spin wager has been selected from the options output in area 406 and actuated the "spin" virtual button in area 410. In embodiments in which only a single type of multi-spin wager is available, there may be no need to determine which type of multi-spin wager the player selected.

In step 504, a first result for a first spin of the multi-spin wager is determined. For example, a random or pseudo-random number or output from an RNG or other algorithm may be requested and received and the first result may be based on this output. In some embodiments, the first result may be output to the player upon being determined (e.g., a virtual roulette wheel may be spun and the ball may be illustrated to land on the number/color portion of the wheel that corresponds to the first result, such as is illustrated in FIG. 4D). In other embodiments, the first result may be determined but not immediately output to the player. For example, the first result may not be output until both the first result and the at least one second result is determined, even in embodiments in which an indication of the first result is output first and then an indication of the second result is output. In step 506 the second result, for the second spin of the multi-spin wager, is determined. In accordance with some embodiments, this second result is determined independently from the first result (i.e., like two tosses of a coin that are independent of one another, the determination of the second result may be independent from the determination of the first result). For example, a second number or other output may be requested and received from an RNG or other algorithm. An indication of the second result may also be output to a player (e.g., as illustrated in FIG. 4E). In some embodiments, steps 504 and 506 may be combined and/or performed essentially simultaneously.

In step 508, a win determination is performed for the multi-spin wager by determining whether the first result (determined in step 504) bears the predetermined relationship to the second result that is required to win the particular multi-spin wager selected by the player. For example, if the player had selected the "different colors" wager, step 508 may comprise determining whether the color on the portion of the wheel corresponding to the first result is different from the color on the portion of the wheel corresponding to the second result. In some embodiments, step 508 may be performed even before an indication of either the first result or the second result is output to the player (e.g., an apparatus performing process 500 may determine whether the player wins the multi-spin wager prior to outputting any information about a result of the multi-spin wager to the player).

In step 510, a player is provided a payout if it is determined in step 508 that the player has won the multi-spin wager. For example, an appropriate number of credits may be added to a credit meter balance of the player. In some embodiments, step 510 may also comprise outputting a message to a player (e.g., via a GUI of the game) to inform the player of whether he has won or lost the multi-spin wager. In some embodiments, if the player has not won the multi-spin wager, the player's wager may be collected in step 510 (e.g., the amount of the player's wager may be deducted from a credit meter balance of the player, if it had not been deducted earlier in the process).

Rules of Interpretation

Numerous embodiments are described in this disclosure, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

The present disclosure is neither a literal description of all embodiments nor a listing of features of the invention that must be present in all embodiments.

The Title (set forth at the beginning of the first page of this disclosure) is not to be taken as limiting in any way as the scope of the disclosed invention(s).

The term "product" means any machine, manufacture and/or composition of matter as contemplated by 35 U.S.C. § 101, unless expressly specified otherwise.

The terms "an embodiment", "embodiment", "embodiments", "the embodiment", "the embodiments", "one or more embodiments", "some embodiments", "one embodiment" and the like mean "one or more (but not all) disclosed embodiments", unless expressly specified otherwise.

The terms "the invention" and "the present invention" and the like mean "one or more embodiments of the present invention."

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "and/or", when such term is used to modify a list of things or possibilities (such as an enumerated list of possibilities) means that any combination of one or more of the things or possibilities is intended, such that while in some embodiments any single one of the things or possibilities may be sufficient in other embodiments two or more (or even each of) the things or possibilities in the list may be preferred, unless expressly specified otherwise. Thus for example, a list of "a, b and/or c" means that any of the following interpretations would be appropriate: (i) each of "a", "b" and "c"; (ii) "a" and "b"; (iii) "a" and "c"; (iv) "b" and "c"; (v) only "a"; (vi) only "b"; and (vii) only "c."

The term "plurality" means "two or more", unless expressly specified otherwise.

The term "herein" means "in the present disclosure, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase at least one of a widget, a car and a wheel means either (i) a widget, (ii) a car, (iii) a wheel, (iv) a widget and a car, (v) a widget and a wheel, (vi) a car and a wheel, or (vii) a widget, a car and a wheel.

The phrase "based on" does not mean "based only on", unless expressly specified otherwise. In other words, the phrase "based on" describes both "based only on" and "based at least on".

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, component or article is described herein, more than one device, component or article (whether or not they cooperate) may alternatively be used in place of the single device, component or article that is described. Accordingly, the functionality that is described as being possessed by a device may alternatively be possessed by more than one device, component or article (whether or not they cooperate).

Similarly, where more than one device, component or article is described herein (whether or not they cooperate), a single device, component or article may alternatively be used in place of the more than one device, component or article that is described. For example, a plurality of computer-based devices may be substituted with a single computer-based device. Accordingly, the various functionality that is described as being possessed by more than one device, component or article may alternatively be possessed by a single device, component or article.

The functionality and/or the features of a single device that is described may be alternatively embodied by one or more other devices that are described but are not explicitly described as having such functionality and/or features. Thus, other embodiments need not include the described device itself, but rather can include the one or more other devices which would, in those other embodiments, have such functionality/features.

Devices that are in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for weeks at a time. In addition, devices that are in communication with each other may communicate directly or indirectly through one or more intermediaries.

A description of an embodiment with several components or features does not imply that all or even any of such components and/or features are required. On the contrary, a variety of optional components are described to illustrate the wide variety of possible embodiments of the present invention(s). Unless otherwise specified explicitly, no component and/or feature is essential or required.

Further, although process steps, algorithms or the like may be described in a sequential order, such processes may be configured to work in different orders. In other words, any sequence or order of steps that may be explicitly described does not necessarily indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not indicate that all or even any of the steps are essential or required. Various other embodiments within the scope of the described invention(s) include other processes that omit some or all of the described steps. Unless otherwise specified explicitly, no step is essential or required.

Although a product may be described as including a plurality of components, aspects, qualities, characteristics and/or features, that does not indicate that all of the plurality are essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

Headings of sections provided in this disclosure are for convenience only, and are not to be taken as limiting the disclosure in any way.

"Determining" something can be performed in a variety of manners and therefore the term "determining" (and like terms) includes calculating, computing, deriving, looking up (e.g., in a table, database or data structure), ascertaining, recognizing, and the like.

A "display" as that term is used herein is an area that conveys information to a viewer. The information may be dynamic, in which case, an LCD, LED, CRT, Digital Light Processing (DLP), rear projection, front projection, or the like may be used to form the display. The aspect ratio of the display may be 4:3, 16:9, or the like. Furthermore, the resolution of the display may be any appropriate resolution such as 480i, 480p, 720p, 1080i, 1080p or the like. The format of information sent to the display may be any appropriate format such as Standard Definition Television (SDTV), Enhanced Definition TV (EDTV), High Definition TV (HDTV), or the like. The information may likewise be static, in which case, painted glass may be used to form the display. Note that static information may be presented on a display capable of displaying dynamic information if desired. Some displays may be interactive and may include touch screen features or associated keypads as is well understood.

The present disclosure may refer to a "control system" or program. A control system or program, as that term is used herein, may be a computer processor coupled with an operating system, device drivers, and appropriate programs (collectively "software") with instructions to provide the functionality described for the control system. The software is stored in an associated memory device (sometimes referred to as a computer readable medium or an article of manufacture, which may be non-transitory in nature). While it is contemplated that an appropriately programmed general purpose computer or computing device may be used, it is also contemplated that hard-wired circuitry or custom hardware (e.g., an application specific integrated circuit (ASIC)) may be used in place of, or in combination with, software instructions for implementation of the processes of various embodiments. Thus, embodiments are not limited to any specific combination of hardware and software.

A "processor" means any one or more microprocessors, Central Processing Unit (CPU) devices, computing devices, microcontrollers, digital signal processors, or like devices. Exemplary processors are the INTEL PENTIUM or AMD ATHLON processors.

The term "computer-readable medium" refers to any statutory medium that participates in providing data (e.g., instructions) that may be read by a computer, a processor or a like device. Such a medium may take many forms, including but not limited to non-volatile media, volatile media, and specific statutory types of transmission media. Non-volatile media include, for example, optical or magnetic disks and other persistent memory. Volatile media include DRAM, which typically constitutes the main memory. Statutory types of transmission media include coaxial cables, copper wire and fiber optics, including the wires that comprise a system bus coupled to the processor. Common forms of computer-readable media include, for example, a floppy disk, a flexible disk, hard disk, magnetic tape, any other magnetic medium, a CD-ROM, Digital Video Disc (DVD), any other optical medium, punch cards, paper tape, any other physical medium with patterns of holes, a RAM, a PROM, an EPROM, a FLASH-EEPROM, a USB memory stick, a dongle, any other memory chip or cartridge, a carrier wave, or any other medium from which a computer can read. The terms "computer-readable memory", "article of manufacture" and/or "tangible media" specifically exclude signals, waves, and wave forms or other intangible or non-transitory media that may nevertheless be readable by a computer.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols. For a more exhaustive list of protocols, the term "network" is defined below and includes many exemplary protocols that are also applicable here.

It will be readily apparent that the various methods and algorithms described herein may be implemented by a control system and/or the instructions of the software may be designed to carry out the processes of the present invention.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models, hierarchical electronic file structures, and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database. Furthermore, while unified databases may be contemplated, it is also possible that the databases may be distributed and/or duplicated amongst a variety of devices.

As used herein a "network" is an environment wherein one or more computing devices may communicate with one another. Such devices may communicate directly or indirectly, via a wired or wireless medium such as the Internet, LAN, WAN or Ethernet (or IEEE 802.3), Token Ring, or via any appropriate communications means or combination of communications means. Exemplary protocols include but are not limited to: Bluetooth™, Time Division Multiple Access (TDMA), Code Division Multiple Access (CDMA), Global System for Mobile communications (GSM), Enhanced Data rates for GSM Evolution (EDGE), General Packet Radio Service (GPRS), Wideband CDMA (WCDMA), Advanced Mobile Phone System (AMPS), Digital AMPS (D-AMPS), IEEE 802.11 (WI-FI), IEEE 802.3, SAP, the best of breed (BOB), system to system (S2S), or the like. Note that if video signals or large files are being sent over the network, a broadband network may be used to alleviate delays associated with the transfer of such large files, however, such is not strictly required. Each of the devices is adapted to communicate on such a communication means. Any number and type of machines may be in communication via the network. Where the network is the Internet, communications over the Internet may be through a website maintained by a computer on a remote server or over an online data network including commercial online service providers, bulletin board systems, and the like. In yet other embodiments, the devices may communicate with one another over RF, cable TV, satellite links, and the like. Where appropriate encryption or other security measures such as logins and passwords may be provided to protect proprietary or confidential information.

Communication among computers and devices may be encrypted to insure privacy and prevent fraud in any of a variety of ways well known in the art. Appropriate cryptographic protocols for bolstering system security are described in Schneier, APPLIED CRYPTOGRAPHY, PROTOCOLS, ALGORITHMS, AND SOURCE CODE IN C, John Wiley & Sons, Inc. 2d ed., 1996, which is incorporated by reference in its entirety.

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

It will be readily apparent that the various methods and algorithms described herein may be implemented by, e.g., appropriately programmed general purpose computers and computing devices. Typically a processor (e.g., one or more microprocessors) will receive instructions from a memory or like device, and execute those instructions, thereby performing one or more processes defined by those instructions. Further, programs that implement such methods and algorithms may be stored and transmitted using a variety of media (e.g., computer readable media) in a number of manners. In some embodiments, hard-wired circuitry or custom hardware may be used in place of, or in combination with, software instructions for implementation of the processes of various embodiments. Thus, embodiments are not limited to any specific combination of hardware and software. Accordingly, a description of a process likewise describes at least one apparatus for performing the process, and likewise describes at least one computer-readable medium and/or memory for performing the process. The apparatus that performs the process can include components and devices (e.g., a processor, input and output devices) appropriate to perform the process. A computer-readable medium can store program elements appropriate to perform the method.

What is claimed is:

1. An apparatus for facilitating an online game of roulette, comprising:

a game controller comprising a processor;

a memory storing a program for interfacing with a web browser of a computing device of a player in order to output game data to the player via a graphical user interface of an online game of roulette, the program comprising instructions for the processor, wherein the processor is operable with the program to:

output in a first portion of the graphical user interface a representation of a roulette wheel;

output in a second portion of the graphical user interface an input mechanism via which the player can indicate a multi-spin wager, wherein a win result of the multi-spin wager is dependent on a plurality of independently-determined results of the roulette game, and further wherein the wager defines a predetermined relationship the plurality of independently-determined results must bear to one another in order for the player to win the wager;

receive, via the input mechanism, a selection by the player of the multi-spin wager and an initiation of a win determination for the multi-spin wager;

determine a first result of the plurality of independently-determined results;

output, in the first portion of the graphical user interface, a representation of the roulette wheel spinning and at least one ball landing on a first section of the roulette wheel that indicates the first result;

determine at least one second result of the plurality of independently-determined results;

output, in the first portion of the graphical user interface and prior to indicating the win result for the multi-spin wager to the player, a representation of the roulette wheel spinning and the at least one ball landing on a second section of the roulette wheel that indicates the second result;

determine the win result for the multi-spin wager by determining whether the first result and the at least one second result bear the pre-determined relationship to one another;

determine that the win result for the multi-spin wager is a win of a payout by the player only if the first result and the at least one second result bear the pre-determined relationship to one another; and provide the payout to the player if the win result is a win of the payout.

2. The apparatus of claim 1, wherein each independently-determined result corresponds to an independent spin of the representation of the roulette wheel.

3. The apparatus of claim 1, wherein the processor being operable with the program to receive, via the input mechanism, a selection by the player of the multi-spin wager and an initiation of a win determination for the multi-spin wager comprises the processor being operable to receive the selection prior to the determination of the first result.

4. The apparatus of claim 1, wherein the processor being operable with the program to output, in the first portion of the graphical user interface and prior to indicating the win result for the multi-spin wager to the player, a representation of the roulette wheel spinning and the at least one ball landing on a second section of the roulette wheel that indicates the at least one second result, comprises the processor further being operable with the program to maintain an output of an indication of the first result while outputting the representation of the roulette wheel spinning and the ball landing on the second section of the roulette wheel that indicates the at least one second result.

5. The apparatus of claim 1, wherein different sections of the roulette wheel represent different colors and further wherein the pre-determined relationship of the multi-spin wager defines that the first result will comprises a different color section of the roulette wheel than will the at least one second result.

6. The apparatus of claim 1, wherein different sections of the roulette wheel represent different numbers and further wherein the pre-determined relationship of the multi-spin wager defines that the first result will be a number that is higher than a number comprising the at least one second result.

7. The apparatus of claim 1, wherein different sections of the roulette wheel represent different numbers and further wherein the pre-determined relationship of the multi-spin wager defines that the first result will be a number that is lower than a number comprising the at least one second result.

8. The apparatus of claim 1, wherein each of the first result and the at least one second result represent specific numbers and the pre-determined relationship of the multi-spin wager defines a characteristic of a result of combining the first result with the at least one second result in accordance with a predetermined formula.

9. The apparatus of claim 8, wherein a first number representing the first result and at least one second number representing the at least once second result are combined by adding them together and the characteristic of the result defines a particular number which is higher than a sum of the first number and the at least one second number.

10. The apparatus of claim 1, wherein the processor is further operable with the program to determine, from a random number generator, a single output for the multi-spin wager, and determine each of the first result and the at least second result based on the single output.

11. The apparatus of claim 1, wherein the processor is further operable with the program to determine, from a first random number generator, a first output for use in determining the first result and at least one second output for use in determining the at least one second result.

12. A non-transitory computer-readable medium storing instructions for directing a processor to output data via a graphical user interface viewable in a web browser of a remote player device, the instructions causing the processor to:

output in a first portion of the graphical user interface a representation of a roulette wheel;

output in a second portion of the graphical user interface an input mechanism via which the player can indicate a multi-spin wager, wherein a win result of the multi-spin wager is dependent on a plurality of independently-determined results of the roulette game, and further wherein the wager defines a predetermined relationship the plurality of independently-determined results must bear to one another in order for the player to win the wager;

receive, via the input mechanism, a selection by the player of the multi-spin wager and an initiation of a win determination for the multi-spin wager;

determine a first result of the plurality of independently-determined results;

output, in the first portion of the graphical user interface, a representation of the roulette wheel spinning and at least one ball landing on a first section of the roulette wheel that indicates the first result;

determine at least one second result of the plurality of independently-determined results;

output, in the first portion of the graphical user interface and prior to indicating the win result for the multi-spin wager to the player, a representation of the roulette wheel spinning and the at least one ball landing on a second section of the roulette wheel that indicates the second result;

determine the win result for the multi-spin wager by determining whether the first result and the at least one second result bear the pre-determined relationship to one another;

determine that the win result for the multi-spin wager is a win of a payout by the player only if the first result and the at least one second result bear the pre-determined relationship to one another; and provide the payout to the player if the win result is a win of the payout.

13. The non-transitory computer-readable medium of claim 12, wherein each independently-determined result corresponds to an independent spin of the representation of the roulette wheel.

14. The non-transitory computer-readable medium of claim 12, wherein the processor being operable with the program to receive, via the input mechanism, a selection by the player of the multi-spin wager and an initiation of a win determination for the multi-spin wager comprises the processor being operable to receive the selection prior to the determination of the first result.

15. The non-transitory computer-readable medium of claim 12, wherein the processor being operable with the program to output, in the first portion of the graphical user interface and prior to indicating the win result for the multi-spin wager to the player, a representation of the roulette wheel spinning and the at least one ball landing on a second section of the roulette wheel that indicates the at least one second result, comprises the processor further being operable with the program to maintain an output of an indication of the first result while outputting the representation of the roulette wheel spinning and the ball landing on the second section of the roulette wheel that indicates the at least one second result.

16. The non-transitory computer-readable medium of claim 12, wherein different sections of the roulette wheel represent different colors and further wherein the pre-determined relationship of the multi-spin wager defines that the first result will comprises a different color section of the roulette wheel than will the at least one second result.

17. The non-transitory computer-readable medium of claim 12, wherein different sections of the roulette wheel represent different numbers and further wherein the pre-determined relationship of the multi-spin wager defines that the first result will be a number that is higher than a number comprising the at least one second result.

18. The non-transitory computer-readable medium of claim 12, wherein different sections of the roulette wheel represent different numbers and further wherein the pre-determined relationship of the multi-spin wager defines that the first result will be a number that is lower than a number comprising the at least one second result.

19. The non-transitory computer-readable medium of claim 12, wherein each of the first result and the at least one second result represent specific numbers and the pre-determined relationship of the multi-spin wager defines a characteristic of a result of combining the first result with the at least one second result in accordance with a predetermined formula.

20. The non-transitory computer-readable medium of claim 12, wherein the processor is further operable with the program to determine, from a random number generator, a single output for the multi-spin wager, and determine each of the first result and the at least second result based on the single output.

* * * * *